(12) United States Patent
Maeda et al.

(10) Patent No.: US 9,787,555 B2
(45) Date of Patent: Oct. 10, 2017

(54) APPARATUS, SYSTEM, AND METHOD OF ACTIVATION CONTROL, AND MEDIUM STORING ACTIVATION CONTROL PROGRAM

(71) Applicants: Kaoru Maeda, Kanagawa (JP); Yoichiro Matsuno, Kanagawa (JP)

(72) Inventors: Kaoru Maeda, Kanagawa (JP); Yoichiro Matsuno, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 221 days.

(21) Appl. No.: 14/601,672

(22) Filed: Jan. 21, 2015

(65) Prior Publication Data
US 2015/0212813 A1   Jul. 30, 2015

(30) Foreign Application Priority Data
Jan. 28, 2014   (JP) .................................. 2014-013314

(51) Int. Cl.
| | | |
|---|---|---|
| G06F 15/16 | (2006.01) | |
| H04L 12/26 | (2006.01) | |
| G06F 9/44 | (2006.01) | |

(52) U.S. Cl.
CPC ............ *H04L 43/04* (2013.01); *G06F 8/71* (2013.01)

(58) Field of Classification Search
None
See application file for complete search history.

(56) References Cited

U.S. PATENT DOCUMENTS

2003/0120979 A1* 6/2003 Lee .................... G06F 11/362
                                                     714/38.1
2006/0137016 A1* 6/2006 Margalit ............... G06F 21/14
                                                      726/26
(Continued)

FOREIGN PATENT DOCUMENTS

| JP | 2004-048557 | 2/2004 |
| JP | 2006-164135 | 6/2006 |
| JP | 2008-227577 | 9/2008 |

OTHER PUBLICATIONS

U.S. Appl. No. 14/601,845, filed Jan. 21, 2015.

*Primary Examiner* — Phuoc Nguyen
(74) *Attorney, Agent, or Firm* — Oblon, McClelland, Maier & Neustadt, L.L.P.

(57) ABSTRACT

An activation control apparatus stores, in a memory, first association information that associates, for each one of a plurality of applications, application identification information for identifying an application with terminal identification information for identifying a communication terminal permitted to debug the application. In response to an activation request for activating a first application from a first communication terminal, the activation control apparatus determines whether the first communication terminal is provided with a debugger. When the first communication terminal is provided with a debugger, the activation control apparatus further determines whether the first communication terminal is permitted to debug the first application using the first association information, and rejects the activation request when the first communication terminal is not permitted to debug the application. When the first communication terminal is not provided with a debugger, the activation control apparatus accepts the activation request.

13 Claims, 26 Drawing Sheets

(56) References Cited

U.S. PATENT DOCUMENTS

| | | | | |
|---|---|---|---|---|
| 2007/0168975 A1* | 7/2007 | Kessler | ............... | G06F 11/362 717/124 |
| 2007/0168997 A1* | 7/2007 | Tran | .................. | G06F 11/3664 717/129 |
| 2009/0165111 A1* | 6/2009 | Zhang | ................. | G06F 21/335 726/9 |
| 2010/0205583 A1* | 8/2010 | Gebhardt | ............. | G06F 11/366 717/127 |
| 2010/0262963 A1* | 10/2010 | Wassermann | ......... | G06F 21/10 717/178 |
| 2011/0004790 A1* | 1/2011 | Rossmann | ........ | G06F 11/3644 714/27 |
| 2011/0131295 A1* | 6/2011 | Jolfaei | ................ | G06F 11/366 709/219 |
| 2012/0084757 A1* | 4/2012 | Tamiya | .............. | G06F 11/3656 717/124 |
| 2014/0324975 A1 | 10/2014 | Tamura | | |

\* cited by examiner

FIG. 10

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 11

APPLICATION USE MANAGEMENT TABLE

| TERMINAL ID | APPLICATION ID | EFFECTIVE PERIOD START DAY | EFFECTIVE PERIOD END DAY |
|---|---|---|---|
| 01aa | a010 | 2013.01.01 | 2013.12.31 |
| 01ab | a001 | 2013.08.01 | 2014.07.31 |
| 01ac | a010 | 2013.01.01 | 2014.07.31 |
| ... | ... | ... | ... |

FIG. 12

APPLICATION URL MANAGEMENT TABLE

| APPLICATION ID | URL OF ICON | URL OF APPLICATION |
|---|---|---|
| a001 | https://ucs.Ulricoh.com/aaa/aicon.jpg | https://ucs.Ulricoh.com/aaa/aaa.html |
| a002 | https://ucs.Ulricoh.com/bbb/bicon.jpg | https://ucs.Ulricoh.com/bbb/bbb.html |
| a003 | https://ucs.Ulricoh.com/ccc/cicon.jpg | https://ucs.Ulricoh.com/ccc/ccc.html |
| a004 | https://ucs.Ulricoh.com/ddd/dicon.jpg | https://ucs.Ulricoh.com/ddd/ddd.html |
| ... | ... | ... |

FIG. 13

DEVELOPER NAME MANAGEMENT TABLE

| DEVELOPER ID | NAME |
|---|---|
| dv01 | COMPANY A |
| dv02 | COMPANY B |
| dv03 | COMPANY C |
| ... | ... |

FIG. 14

APPLICATION DEVELOPER MANAGEMENT TABLE

| APPLICATION ID | DEVELOPER ID |
|---|---|
| a010 | dv01 |
| a011 | dv01 |
| a012 | dv02 |
| a013 | dv03 |
| a014 | dv02 |
| a015 | dv01 |
| ... | ... |

FIG. 15

DEVELOPMENT TERMINAL MANAGEMENT TABLE

| TERMINAL ID | DEVELOPER ID |
|---|---|
| 01ac | dv01 |
| 01bc | dv01 |
| 01cc | dv02 |
| 01dc | dv02 |
| ... | ... |

APPARATUS, SYSTEM, AND METHOD OF ACTIVATION CONTROL, AND MEDIUM STORING ACTIVATION CONTROL PROGRAM

CROSS-REFERENCE TO RELATED APPLICATIONS

This patent application is based on and claims priority pursuant to 35 U.S.C. §119(a) to Japanese Patent Application No. 2014-013314, filed on Jan. 28, 2014, in the Japan Patent Office, the entire disclosure of which is hereby incorporated by reference herein.

BACKGROUND

Technical Field

The present invention relates to control of activation of an application that can be activated on a plurality of communication terminals.

Description of the Related Art

Communication systems that perform a videoconference or the like via a communication network such as the Internet or a dedicated line have become popular in recent years due to a demand for reducing business trip costs and time. In such communication systems, a videoconference is performed through transmitting/receiving image data and sound data between a plurality of communication terminals.

In communication systems using personal computers (PCs), mobile phones, or the like, a communication terminal may obtain an application from an application server, and activates the obtained application on the communication terminal. In these communication systems, a debugger may be used in development or maintenance of such application. More specifically, with the debugger, the contents of application that is activated on the communication terminal, such as a source code, can be checked, to detect, for example, a bug.

SUMMARY

Example embodiments of the present invention include an activation control apparatus that controls activation of a plurality of application that can be activated on a plurality of communication terminals. The activation control apparatus stores, in a memory, first association information that associates, for each one of the plurality of applications, application identification information for identifying an application with terminal identification information for identifying a communication terminal permitted to debug the application. In response to receiving an activation request for activating a first application of the plurality of applications from a first communication terminal of the plurality of communication terminals, the activation control apparatus determines whether the first communication terminal is provided with a debugger. When the first communication terminal is provided with a debugger, the activation control apparatus further determines whether the first communication terminal is permitted to debug the first application using the first association information, and rejects the activation request when the first communication terminal is not permitted to debug the application. When the first communication terminal is not provided with a debugger, the activation control apparatus accepts the activation request to allow the first communication terminal to activate the first application on the first communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is an illustration of a terminal authentication management table;

FIG. 11 is an illustration of an application use management table according to a first embodiment;

FIG. 12 is an illustration of an application uniform resource locater (URL) management table;

FIG. 13 is an illustration of a developer name management table;

FIG. 14 is an illustration of an application developer management table;

FIG. 15 is an illustration of a development terminal management table;

Figure 1:
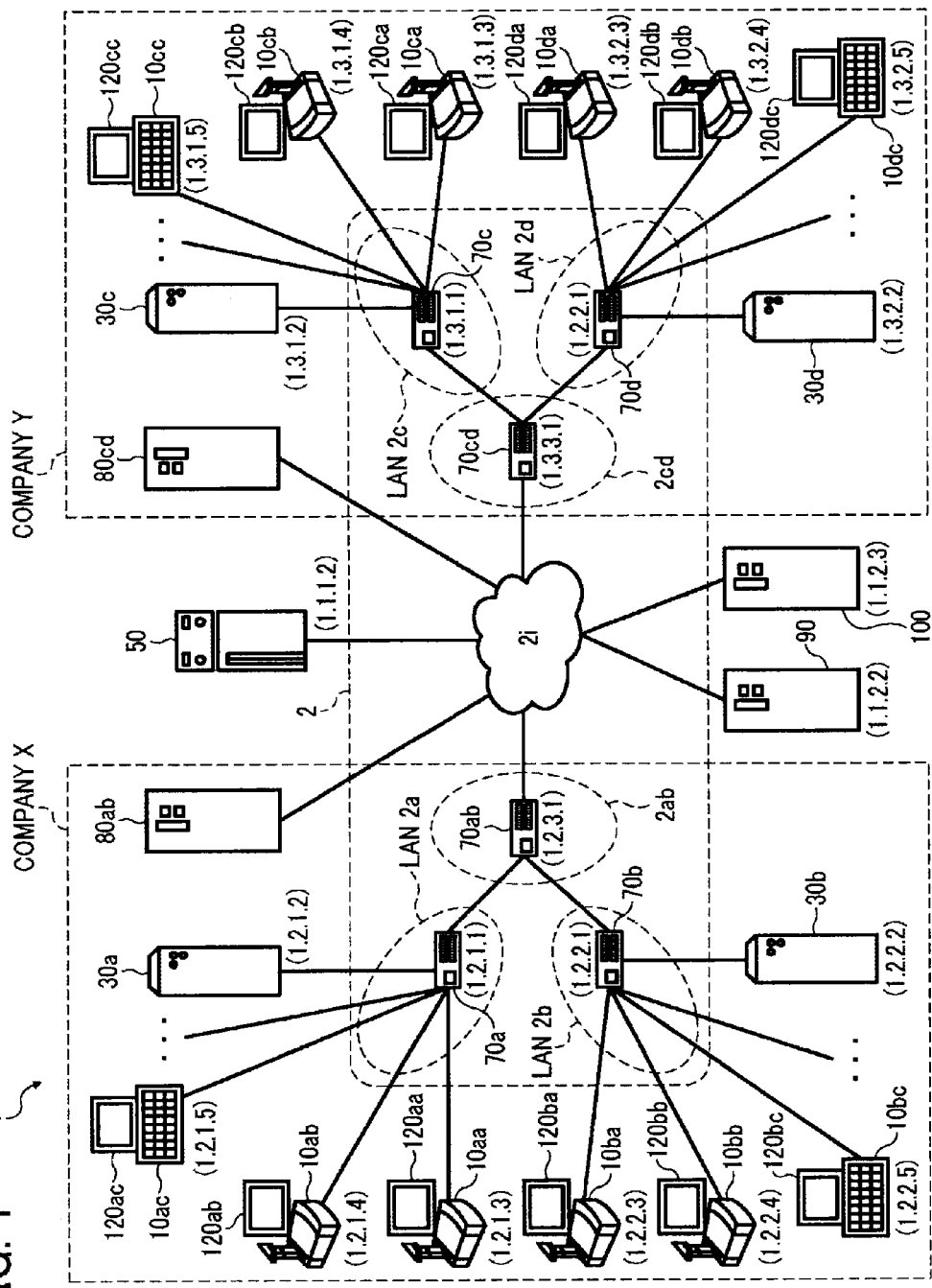
FIG. 1 is a schematic diagram of a communication system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described using the drawings.

First Embodiment

First, a first embodiment of the present invention will be described.

<<Overall Configuration of Embodiment>>

FIG. 1 is a schematic diagram of a communication system 1 according to the first embodiment of the present invention. As illustrated in FIG. 1, the communication system 1 includes a plurality of communication terminals (10*aa*, 10*ab*, . . . ), displays (120*aa*, 120*ab*, . . . ) for the respective communication terminals (10*aa*, 10*ab*, . . . ), a plurality of relay devices (30*a*, 30*b*, 30*c*, and 30*d*), a communication management system 50, application servers (80*ab* and 80*cd*), a program providing system 90, and a maintenance system 100.

In the following description, the term "communication terminal" is simply represented as the term "terminal", and the term "communication management system" is simply represented as the term "management system". In addition, an arbitrary one or ones of the plurality of terminals (10*aa*, 10*ab*, . . . ) is/are represented as a "terminal(s) 10". An arbitrary one or ones of the plurality of displays (120*aa*, 120*ab*, . . . ) is/are represented as a "display(s) 120". An arbitrary one or ones of the plurality of relay devices (30*a*, 30*b*, 30*c*, and 30*d*) is/are represented as a "relay device(s) 30". Further, a terminal serving as a request sender that gives a request to start a videoconference is represented as a "request sender terminal", and a terminal serving as a counterpart terminal that is a request destination (relay destination) is represented as a "counterpart terminal". In addition, an arbitrary one or ones of routers (70*a*, 70*b*, 70*c*, 70*d*, 70*ab*, and 70*cd*) is/are represented as a "router(s) 70". In addition, an arbitrary one of the application servers (80*ab* and 80*cd*) is represented as an "application server 80". Note that communication can be achieved using sound, video (image), or sound and video (image).

With the communication system 1, a videoconference is performed among remotely-located places, through communicating image data and sound data, serving as examples of communication data. Note that the plurality of routers (70*a*, 70*b*, 70*c*, 70*d*, 70*ab*, and 70*cd*) select an optimal path for communication data.

In addition, the terminals (10*aa*, 10*ab*, 10*ac*, . . . ), the relay device 30*a*, and the router 70*a* are connected to be communicable with each other by a local area network (LAN) 2a. The communication terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab. Further, the LAN 2a, the LAN 2b, and the dedicated line 2ab are configured in a company X, serving as an example of a company. For example, the LAN 2a is configured in an office A in the company X, and the LAN 2b is configured in an office B in the company X.

In this example, among the terminals 10 owned by the company X, the terminals (10ac and 10bc) are development terminals, each of which are used for development of applications that may run on each terminal 10 of the communication system 1, and are provided with a debugger. The application server 80ab is an application server owned by the company X and is connected to the Internet 2i. Applications developed by the terminals (10ac and 10bc) are uploaded to the application server 80ab owned by the company X. In addition, each terminal 10 of the communication system 1 can download the applications from the application server 80ab and use the applications.

In contrast, the communication terminals (10ca, 10cb, 10cc, . . . ), the relay device 30c, and the router 70c are connected to be communicable with each other by a LAN 2c. The communication terminals 10d (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd. Further, the LAN 2c, the LAN 2d, and the dedicated line 2cd are configured in a company Y, serving as an example of a company. For example, the LAN 2c is configured in an office C in the company Y, and the LAN 2d is configured in an office D in the company Y. The company X and the company Y are connected to be communicable with each other from the routers (70ab and 70cd), respectively, via the Internet 2i.

In this example, among the terminals 10 owned by the company Y, the terminals (10cc and 10dc) are development terminals, each of which are used for development of applications that may run on each terminal 10 of the communication system 1, and are provided with a debugger. The application server 80cd is an application server owned by the company Y and is connected to the Internet 2i. Applications developed by the terminals (10cc and 10dc) are uploaded to the application server 80cd owned by the company Y. In addition, each terminal 10 of the communication system 1 can download the applications from the application server 80cd and use the applications.

Further, the management system 50, the program providing system 90, and the maintenance system 100 are connected to the Internet 2i. Note that the locations of the management system 50, the program providing system 90, and the maintenance system 100 are not restricted, and these systems may be located in the same area or the same country or may be located in different areas or different countries.

Also in the embodiment, a communication network 2 of the embodiment includes the LAN 2a, the LAN 2b, the dedicated line tab, the Internet 2i, the dedicated line 2cd, the LAN 2c, and the LAN 2d. The communication network 2 may include not only a wired betwork, but also a network where communication is performed wirelessly, such as Wireless Fidelity (WiFi) or Bluetooth (registered trademark).

In addition in FIG. 1, four digits indicated below each of the terminals 10, each of the relay devices 30, the management system 50, each of the routers 70, the program providing system 90, and the maintenance system 100 indicates an IP address in an abbreviated form in the general Internet Protocol version 4 (IPv4). For example, the IP address of the terminal 10aa is "1.2.1.3". Although IPv6 may be used instead of IPv4, IPv4 is used in order to make the description simple.

Note that the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a mobile phone communication network or the like is performed.

The terminals 10 illustrated in FIG. 1 achieve communication between or among users through transmitting/receiving communication data, and may be implemented by videoconference terminals, for example. Further, the terminals 10 transmit/receive communication data by using any desired communication protocol (a call control protocol for connecting or disconnecting to/from a communication destination, and a encoding format for converting communication data to IP packets).

Examples of the call control protocol includes the following: (1) Session Initiation Protocol (SIP); (2) H.323; (3) the extended SIP; (4) instant messaging (IM) protocol; (5) protocol using the SIP message method; (6) Internet Relay Chat (IRC) protocol; and (7) extended IM based protocol. Among them, (4) IM protocol is a protocol used in, for example, (4-1) Extensible Messaging and Presence Protocol (XMPP) or (4-2) ICQ (registered trademark), AIM (registered trademark), or Skype (registered trademark). In addition, (7) extended IM based on protocol is Jingle, for example.

Further, in this example, each of the terminals 10 is installed with a plurality of communication applications to be used for carrying out communication before the terminal 10 is shipped to a user side.

The terminals 10 that communicate with each other using the same communication application are capable of communicating via the communication network 2. Examples of the communication applications, such as communication and messaging applications, include, but not limited to, Skype, Google Talk, LINE, FaceTime, Kakao Talk, and Tango (registered or unregistered trademarks), for example, besides videoconference communication applications.

Figure 2:
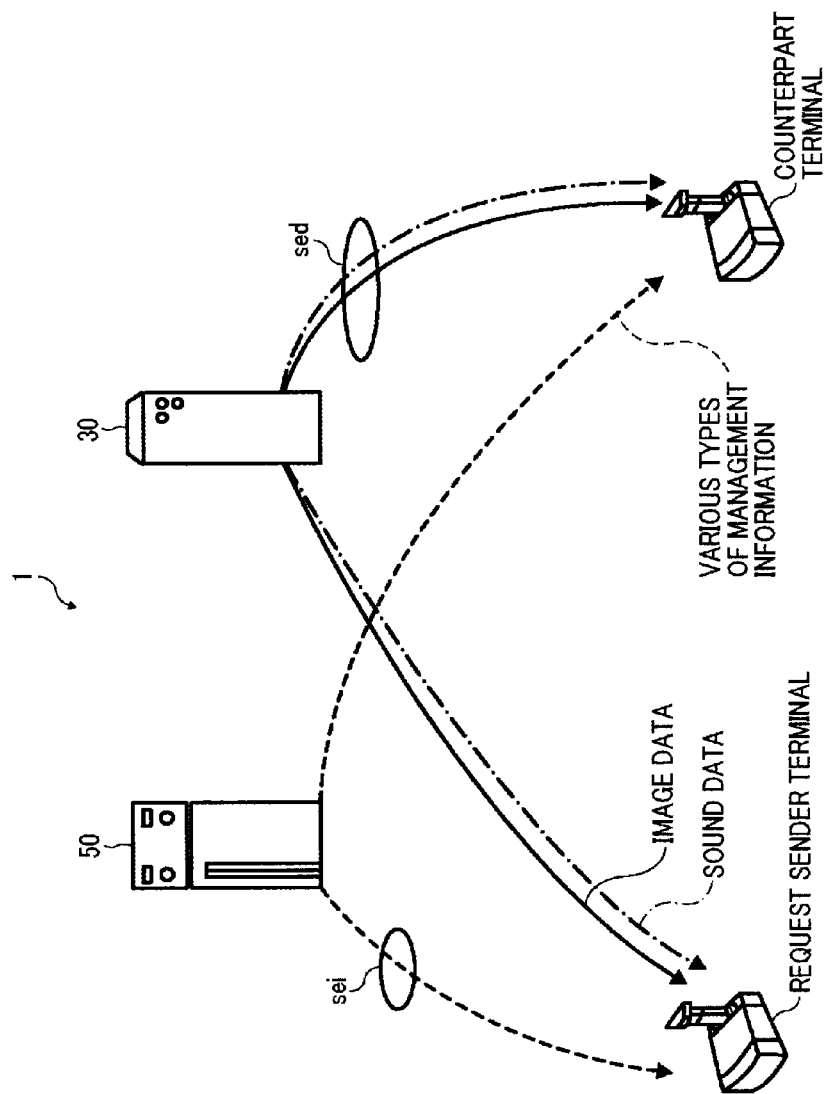
FIG. 2 is an illustration for explaining transmission or reception of data between communication terminals of the communication system of FIG. 1.

In addition, as illustrated in FIG. 2, a management information session sei for transmitting and receiving various types of management information is established via the management system 50 between a request sender terminal and a counterpart terminal in the communication system 1. A session for transmitting and receiving each of image data and sound data via a corresponding one of the relay devices 30 is also established between the request sender terminal and the counterpart terminal. Here, this session is indicated as an image/sound data session sed.

<<Hardware Configuration of Communication System>>

Next, the hardware configuration of the communication system 1 of the embodiment will be described. First, the hardware configuration of the terminals 10 will be described. The terminals 10 include videoconference terminals that carry out a videoconference between terminals 10 by using a communication application, and PCs for developing communication applications (hereinafter referred to as "development terminals") that can use a communication application and that have a debugger for the communication application. Hereinafter, the appearance of each of the videoconference terminals will be described.

Figure 3:
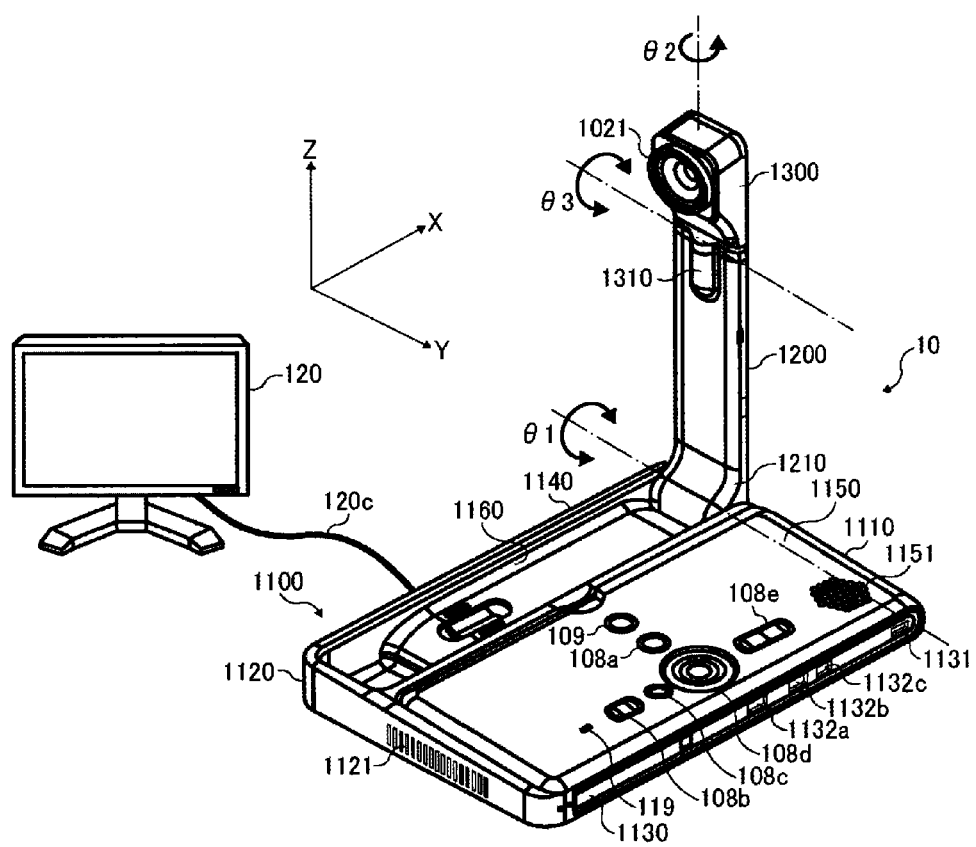
FIG. 3 is an example of an outer appearance of the communication terminal of the communication system of FIG. 1, functioning as a videoconference terminal.

FIG. 3 is an external view of a terminal 10 according to the embodiment. As illustrated in FIG. 3, the terminal 10 includes a casing 1100, an arm 1200, and a camera housing 1300. The casing 1100 has a front wall 1110 with an inlet face including a plurality of inlet holes, and a back wall 1120 having an exhaust face 1121 on which a plurality of exhaust holes are formed. Accordingly, by driving of a cooling fan included in the casing 1100, air behind the transmission terminal 10 can be taken in via the inlet face and exhausted to the rear of the terminal 10 via the exhaust face 1121. The casing 1100 has a right-side wall 1130 provided with a sound pickup hole 1131 formed thereon. Through the sound pickup hole 1131, a built-in microphone 114, described later, is capable of picking up sound and noise.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. The operation panel 1150 also has a sound output face 1151 formed thereon, which is formed of a plurality of sound output holes for allowing output sound from a built-in speaker 115, described later, to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port (not illustrated) for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 so as to be rotatable in the vertical direction within a range of a tilt angle θ1 of 135 degrees with respect to the casing 1100. FIG. 2 indicates a state in which the tilt angle θ1 is 90 degrees. The camera housing 1300 has a built-in camera 112 provided thereon, which will be described later, and the camera 112 can capture an image of a user, a document, a room, or the like. The camera housing 1300 also has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the state illustrated in FIG. 2 serving as 0 degrees.

Note that the external view illustrated in FIG. 3 is only exemplary and the appearance is not restricted thereto. The terminal 10 may be, for example, a general PC, a smart phone, a tablet terminal, an electronic black board, a projector, a car navigation apparatus mounted on a car, an image forming apparatus such as a multifunction peripheral or a printer, or a wearable terminal. The camera 112 and the microphone 114 need not necessarily be built-in devices and may be external devices.

Since the development terminals among the terminals 10, the management system 50, the program providing system 90, and the maintenance system 100 each have the same appearance as that of a general server computer, descriptions of the appearances thereof are omitted.

Figure 4:
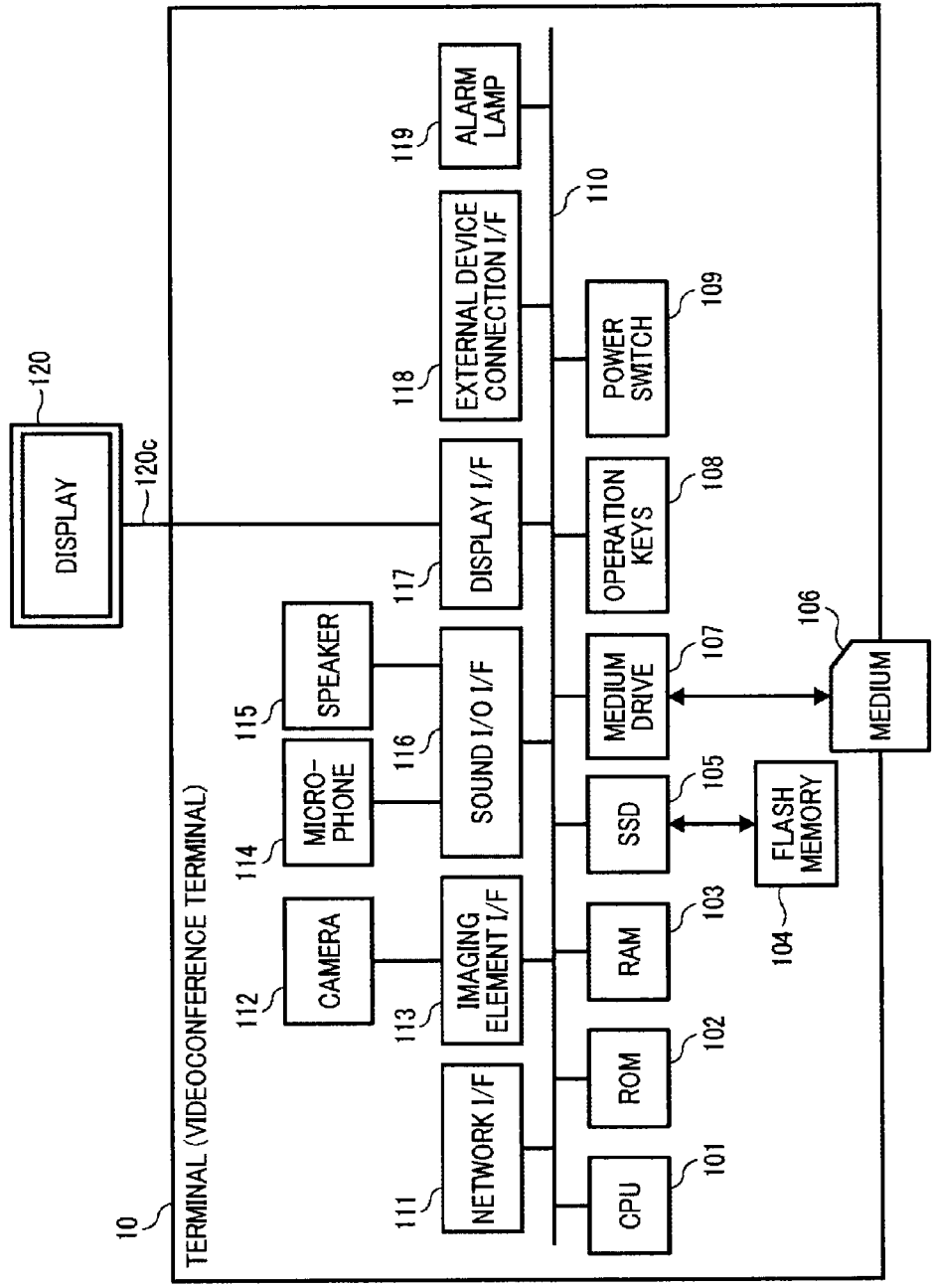
FIG. 4 is a hardware configuration diagram of the communication terminal of FIG. 1, functioning as a videoconference terminal.

Next, the hardware configuration of each of the videoconference terminals among the terminals 10 will be described. FIG. 4 is a hardware configuration diagram of a terminal 10 according to the embodiment. As illustrated in FIG. 4, the terminal 10 includes a central processing unit (CPU) 101 that controls the overall operation of the terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as a program for the communication terminal 10, image data, and audio data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal of the terminal 10, the power switch 109 for turning on/off the power of the terminal 10, and a network interface (I/F) 111 for transmitting data using the communication network 2.

The terminal 10 also includes the built-in camera 112, which captures an image of a subject and obtains image data under control of the CPU 101, an imaging element I/F 113 that controls driving of the camera 112, the built-in microphone 114, which receives an audio input, the built-in speaker 115, which outputs sound, an audio input/output I/F 116 that processes inputting/outputting of an audio signal between the microphone 114 and the speaker 115 under control of the CPU 101, a display I/F 117 that transmits image data to an external display 120 under control of the CPU 101, the external device connection I/F 118 for connecting various external devices, the alarm lamp 119, which indicates an abnormality of various functions of the terminal 10, and a bus line 110 such as an address bus and a data bus for electrically connecting the above-described elements as illustrated in FIG. 4.

Each of the displays 120 displays an image of a subject, an operated image, or the like, and includes a liquid crystal display (LCD) or an organic electroluminescence (EL) display. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

Figure 6:
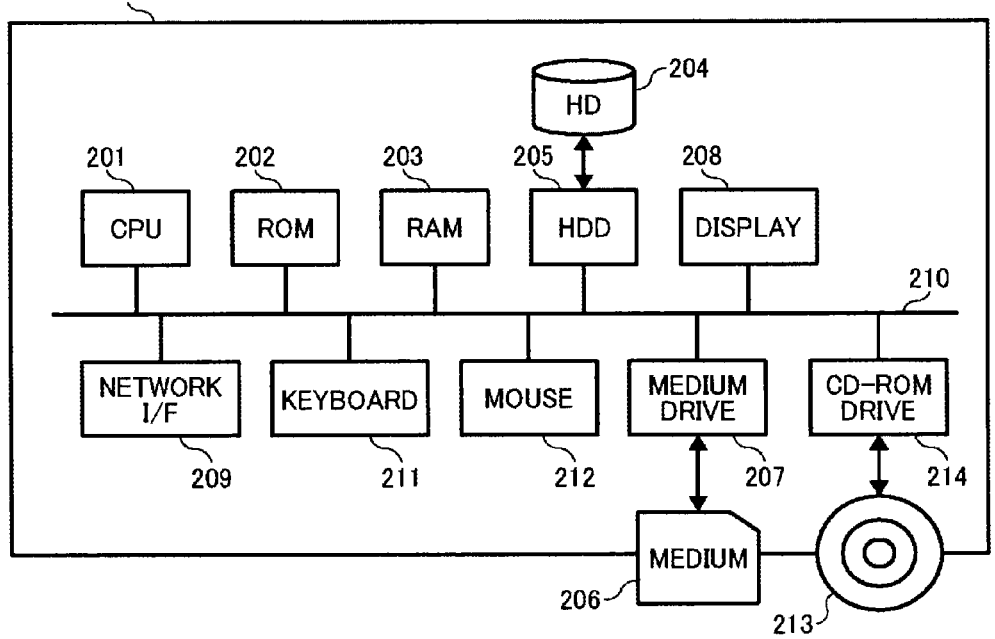
FIG. 6 is a hardware configuration diagram of any one of a communication management system, relay device, application server, program providing system, and maintenance system of the communication system of FIG. 1.

The external device connection I/F 118 is capable of electrically connecting an external device such as an external camera, an external microphone, or an external speaker by using a Universal Serial Bus (USB) cable or the like, which is inserted into the connection port 1132 of the casing 1100 illustrated in FIG. 6. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Figure 5:
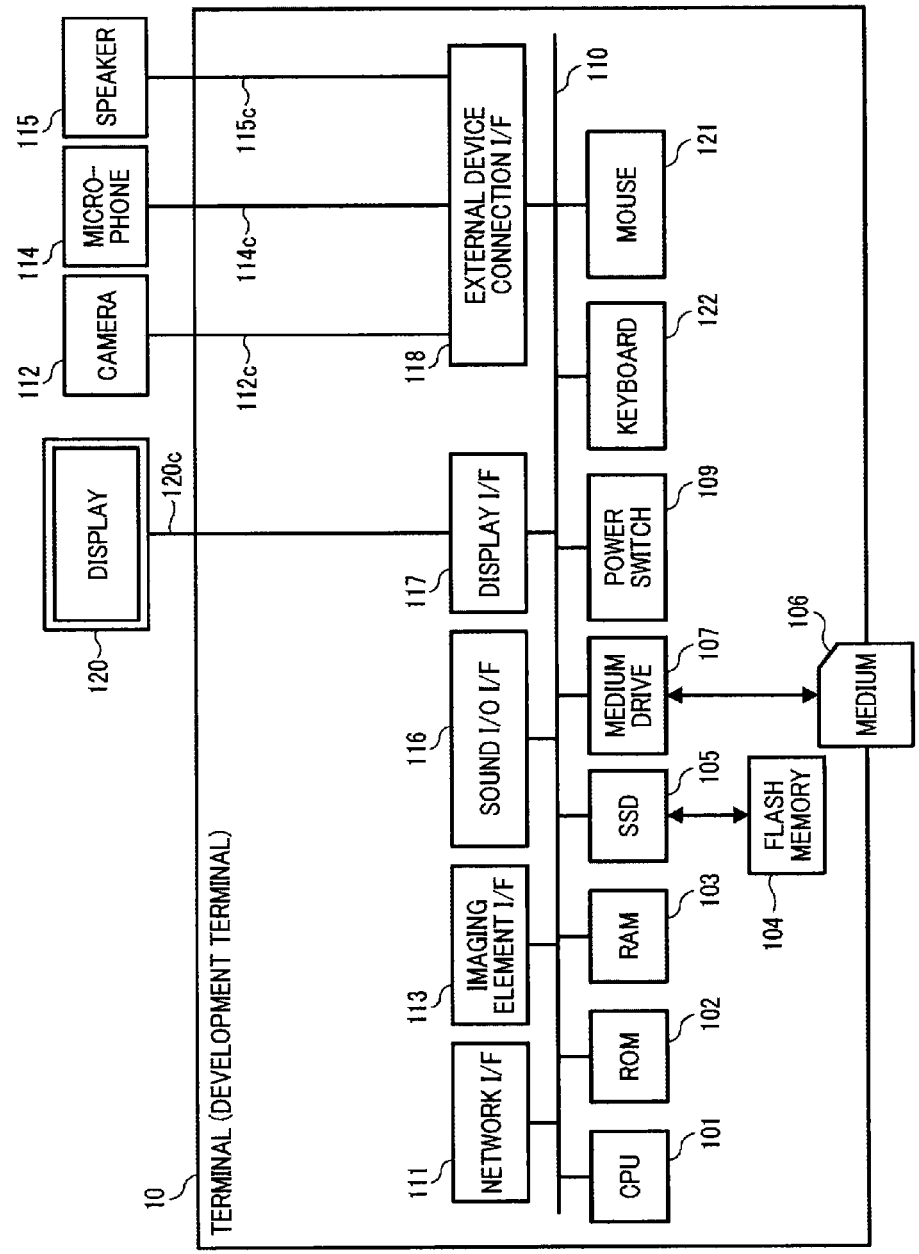
FIG. 5 is a hardware configuration diagram of the communication terminal of FIG. 1, functioning as a development terminal.

Next, the points of the hardware configuration of each of the development terminals among the terminals 10 that are different from the videoconference terminals will be described. FIG. 5 is a hardware configuration diagram of a terminal 10 serving as the development terminal according to the embodiment. In the development terminal, the camera 112, the microphone 114, and the speaker 115 are externally-connected external devices and are connected to the external device connection I/F 118 via respective cables (112c, 114c, and 115c).

In addition, the development terminal has no operation keys 108, and, instead, the development terminal includes a keyboard 122 and a mouse 121 which serve as means for accepting inputs such as characters or selection results from a user. The development terminal also has no alarm lamp 119, and instead, the development terminal is configured to notify the user of an error in the terminal 10 by using the speaker 115 or the display 120.

FIG. 6 is a hardware configuration diagram of the management system 50 according to the embodiment of the present invention. The management system 50 includes a CPU 201 that controls the overall operation of the terminal management system 50, a ROM 202 that stores a program used for driving the CPU 201, such as an IPL, a RAM 203 used as a work area for the CPU 201, an HD 204 that stores various types of data, such as a program for the management system 50, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Meanwhile, since the relay devices 30, the application server 80, the program providing system 90, and the maintenance system 100 each have a hardware configuration that is the same as or similar to that of the above-described management system 50, descriptions thereof are omitted.

Figure 7:
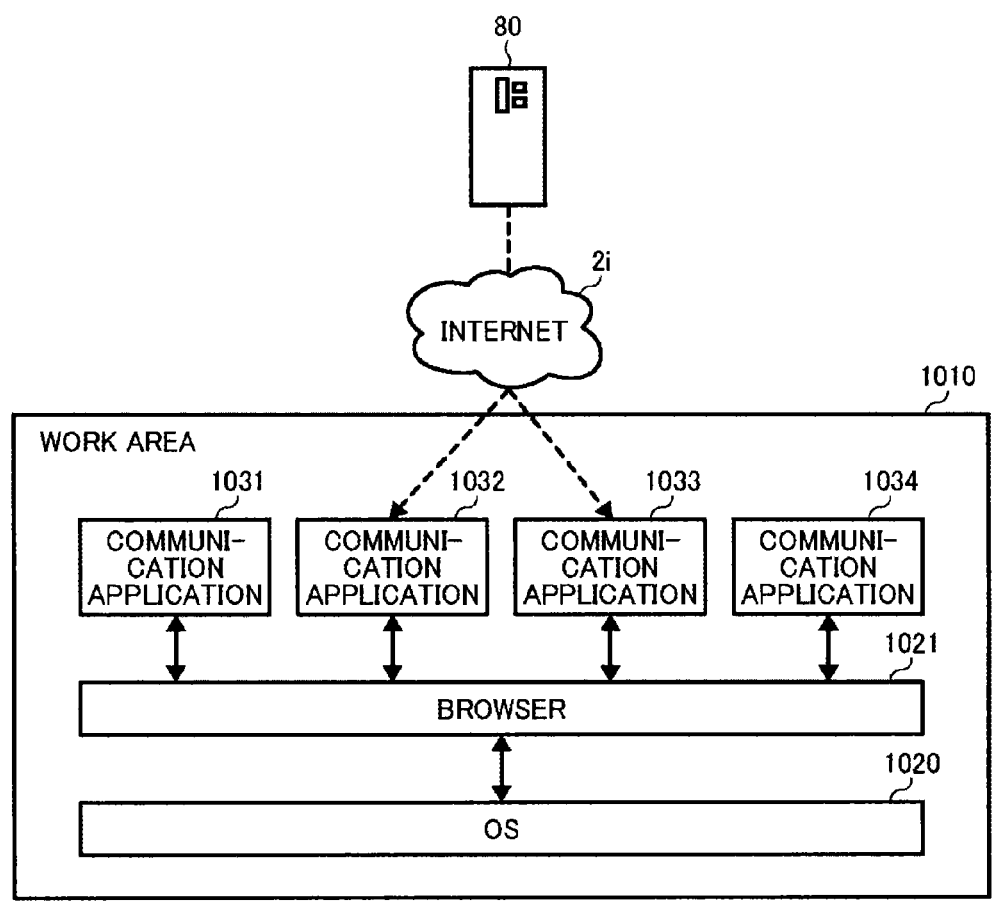
FIG. 7 is a software configuration diagram of the communication terminal of FIG. 1, functioning as a videoconference terminal.

Next, the software configuration of each of the videoconference terminals among the terminals 10 will be described. FIG. 7 is a software configuration diagram of a videoconference terminal. As illustrated in FIG. 7, an operating system (OS) 1020, a communication application 1031, a communication application 1032, a communication application 1033, and a communication application 1034 run on a work area 1010 of the RAM 103. The OS 1020 is installed in the terminal 10 prior to shipment to a user site, though this is not particularly limited. In addition, the communication applications (1031, 1032, 1033, and 1034) may be installed in the terminal 10 prior to shipment or may be obtained from the application server 80 subsequent to shipment and installed in the terminal 10, though this is not particularly limited.

In addition, among these applications, the OS 1020 is the basic software which provides basic functions and manages the entire terminal 10. A browser is software that runs on the OS 1020 and is used to enable displaying and browsing of information to achieve a specific objective. The communication applications (1031, 1032, 1033, and 1034) are software that runs on a browser 1021 and are used to perform communication with another terminal 10. Note that, according to the embodiment of the present invention, the communication applications (1031, 1032, 1033, and 1034) may communicate with another terminal 10 using different communication protocols that are different from one another.

Note that the communication applications (1031, 1032, 1033, and 1034) are only exemplary, and other applications may be installed; for the sake of the simplicity of the description, four types of applications are described. In addition, in the case where a plurality of communication applications is installed, communication applications of different protocols may be installed, as in (1) to (7) described above.

Figure 8:
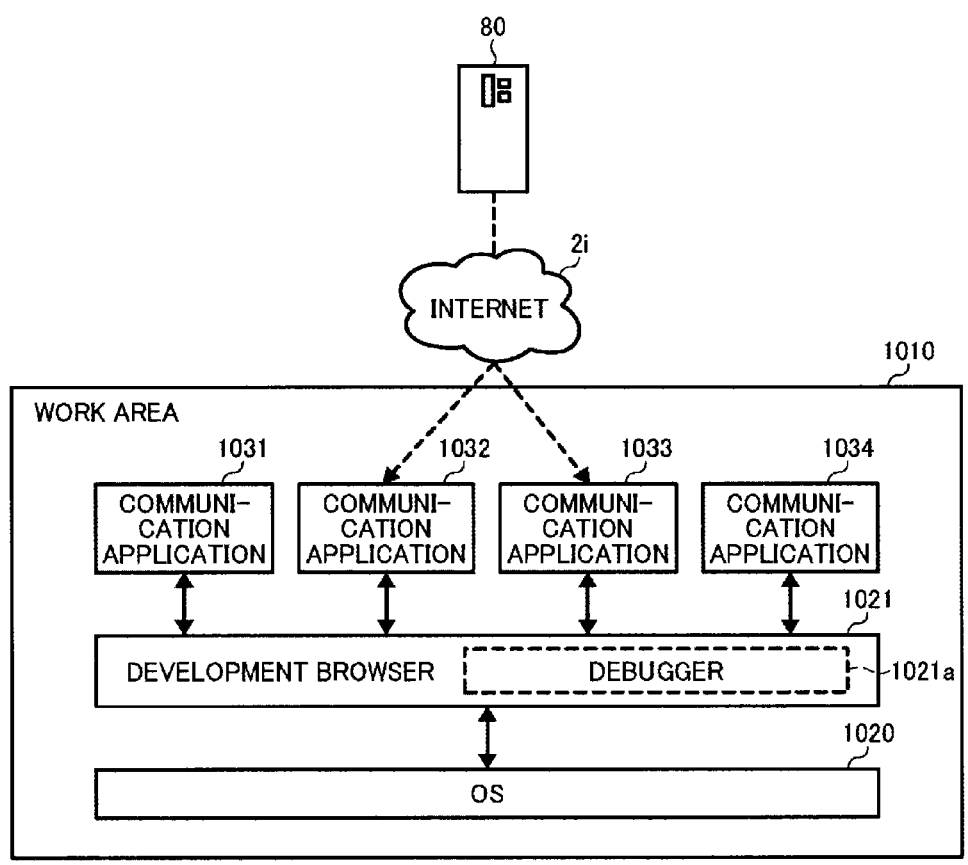
FIG. 8 is a software configuration diagram of the communication terminal of FIG. 1, functioning as a development terminal.

Next, the points of the software configuration of each of the development terminals among the terminals 10 that are different from the videoconference terminals will be described. FIG. 8 is a software configuration diagram of a development terminal. In the development terminal, a development browser 1021 is installed as a browser that runs on the OS 1020. The development browser 1021 is different from the browser 1021 of a videoconference terminal in the point that a debugger 1021a accompanies the development browser 1021. The debugger 1021a is used to perform debugging of the communication applications (1031, 1032, 1033, and 1034) when the communication applications (1031, 1032, 1033, and 1034) are activated on the browser 1021, by checking the contents of the activated applications, such as the source code.

<<Functional Configuration of Communication System>>

Figure 9:
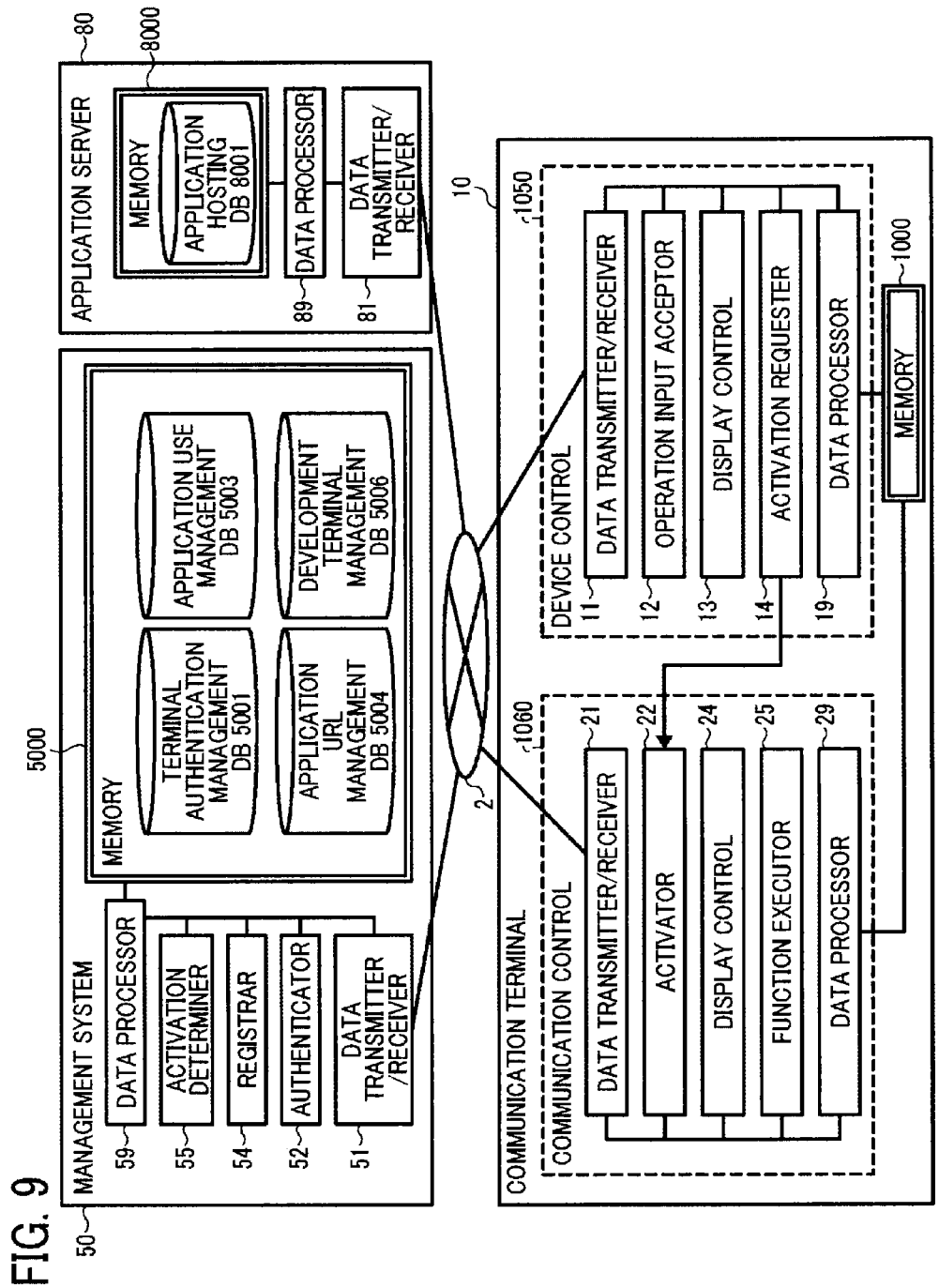
FIG. 9 is a functional block diagram of the communication terminal, the communication management system, and the application server, of the communication system of FIG. 1.

Next, the functional configuration of the communication system 1 of the embodiment will be described. FIG. 9 is a functional block diagram of a terminal 10, the management system 50, and the application server 80 that constitute part of the communication system 1 of the embodiment. In FIG. 9, the terminal 10 and the management system 50 are connected to be capable of communicating data via the communication network 2.

<Functional Configuration of Terminal>

The terminal 10 includes a device control 1050 and a communication control 1060. The device control 1050 is executed with activation of the OS 1020 and the browser 1021 illustrated in FIG. 7 or 8. In addition, the communication control 1060 is executed with activation of any of the communication applications (1031, 1032, 1033, and 1034) illustrated in FIG. 7 or 8.

The device control 1050 includes a data transmitter/receiver 11, an operation input acceptor 12, a display control 13, an activation requester 14, and a data processor 19. These elements correspond to functions that are realized by operating any of the elements illustrated in FIG. 4 or 5 in response to a command from the CPU 101 in accordance with an activation application (program) expanded from the flash memory 104 to the RAM 103.

The communication control 1060 includes a data transmitter/receiver 21, an activator 22, a display control 24, a function executor 25, and a data processor 29. These elements are functions that are realized by operating any of the elements illustrated in FIG. 4 or 5 in response to a command from the CPU 101 in accordance with a communication application (program) expanded from the flash memory 104 to the RAM 103.

The terminal 10 also includes a memory 1000 configured by the ROM 102, the RAM 103, and the flash memory 104, illustrated in FIG. 4 or 5.

(Functional Configuration of Device Control)

Next, using FIG. 9, functional configuration of the device control 1050 of the terminal 10 will be described. Note that, in the following description of functional configuration of the device control 1050 of the terminal 10, among elements illustrated in FIG. 4 or 5, relationships with main elements for realizing each functional configuration of the device control 1050 will also be described.

The data transmitter/receiver 11 of the terminal 10 illustrated in FIG. 9 is implemented by a command from the CPU 101 illustrated in FIG. 4 or 5 and by the network I/F 111 illustrated in FIG. 4 or 5, and performs transmission/reception of various types of data (or information) to/from a counterpart terminal, apparatus, or system via the communication network 2.

The operation input acceptor 12 is implemented by a command from the CPU 101 illustrated in FIG. 4 or 5 and by the operation keys (108*a*, 108*b*, 108*c*, 108*d*, and 108*e*) and the power switch 109 illustrated in FIG. 3, and accepts various inputs or various selections from the user. For example, when the user turns on the power switch 109 illustrated in FIG. 3, the operation input acceptor 12 illustrated in FIG. 9 accepts the power on operation and turns on the power.

The display control 13 is implemented by a command from the CPU 101 illustrated in FIG. 4 or 5 and by the display I/F 117 illustrated in FIG. 4 or 5, and performs control for transmitting image data, sent from a counterpart terminal at the time of communication, to the display 120.

The data processor 19 is implemented by a command from the CPU 101 illustrated in FIG. 4 or 5 and by the SSD 105 illustrated in FIG. 4 or 5, or by a command from the CPU 101, and performs processing to store various types of data in the memory 1000 or to read various types of data stored in the memory 1000.

The activation requester 14 is implemented by the browser 1021 on the basis of a command from the CPU 101 illustrated in FIG. 4 or 5, and requests the communication control 1060 to activate the communication applications (1031, 1032, 1033, and 1034).

(Functional Configuration of Communication Control)

Next, referring to FIGS. 4, 5, and 9, functional configuration of the communication control 1060 of the terminal 10 will be described. Note that, in the following description of functional configuration of the communication control 1060 of the terminal 10, among elements illustrated in FIG. 4 or 5, relationships with main elements for implementing functional configuration of the communication control 1060 will also be described.

The data transmitter/receiver 21 illustrated in FIG. 9 is implemented by a command from the CPU 101 illustrated in FIG. 4 or 5 and by the network I/F 111 illustrated in FIG. 4 or 5, and performs transmission/reception of various types of data (or information) to/from a counterpart terminal, apparatus, or system via the communication network 2.

The activator 22 is implemented by a command from the CPU 101 illustrated in FIG. 4 or 5. When the operation input acceptor 12 of the device control 1050 accepts selection of an application by the user, the activator 22 activates the communication control 1060 (communication application) in response to an activation request from the operation input acceptor 12.

The display control 24 is implemented by a command from the CPU 101 illustrated in FIG. 4 or 5 and by the display I/F 117 illustrated in FIG. 4 or 5, and performs control for transmitting screen data to the display 120.

The function executor 25 is implemented by a command from the CPU 101 illustrated in FIG. 4 or 5 and by the camera 112, the microphone 114, the speaker 115, or the like illustrated in FIG. 4 or 5, and controls communication through images, sounds, or the like.

The data processor 29 is implemented by a command from the CPU 101 illustrated in FIG. 4 or 5 and by the SSD 105 illustrated in FIG. 4 or 5, or by a command from the CPU 101, and performs processing to store various types of data in the memory 1000 or to read various types of data stored in the memory 1000.

<Functional Configuration of Management System>

The management system 50 includes a data transmitter/receiver 51, an authenticator 52, a registrar 54, an activation determiner 55, and a data processor 59. These elements correspond to functions that are realized by operating any of the elements illustrated in FIG. 6 in response to a command from the CPU 201 in accordance with a program for the management system 50, which is expanded from the HD 204 to the RAM 203. In addition, the management system 50 includes a memory 5000 configured by the HD 204 illustrated in FIG. 6. In the memory 5000, databases (DBs) (5001, 5003, 5004, and 5006) are stored in the form of tables as discussed below.

(Terminal Authentication Management Table)

FIG. 10 is an illustration of a terminal authentication management table. In the memory 5000, the terminal authentication management DB 5001 configured by a terminal authentication management table such as that illustrated in FIG. 10 is stored. The terminal authentication management table stores, for each of the terminals 10 managed by the management system 50, a password for authentication in association with the terminal ID of the terminal. For example, the terminal authentication management table illustrated in FIG. 10 indicates that the terminal ID of the terminal 10*aa* is "01aa", and the password of the terminal 10*aa* is "aaaa", (Application Use Management Table)

FIG. 11 is an illustration of an application use management table. In the memory 5000, the application use management DB 5003 configured by an application use management table such as that illustrated in FIG. 11 is stored. The application use management table stores, for each one of applications that are installed in each terminal 10, the start day and the end day of a period in which the application installed in the terminal 10 can be used (effective period) in association with the terminal ID for identifying the terminal 10 and the application ID for identifying the application. For example, in the application use management table illustrated in FIG. 11, it is indicated that the terminal 10*aa* whose terminal ID is "01aa" can use an application identified by the application ID "a010" from Jan. 1, 2013 to Dec. 31, 2013.

(Application URL Management Table)

FIG. 12 is an illustration of an application URL management table. In the memory 5000, the application URL management DB 5004 configured by an application URL management table such as that illustrated in FIG. 12 is stored. The application URL management table stores, for each of a plurality of applications managed by the management system 50, URL information indicating a location of icon data on the communication network 2 and URL information indicating a location of the application on the communication network 2, in association with the application ID.

(Development Terminal Management DB)

In the memory 5000, the development terminal management DB 5006 configured by a developer name management table such as that illustrated in FIG. 13, an application developer management table such as that illustrated in FIG. 14, and a development terminal management table such as that illustrated in FIG. 15 is stored. Note that FIG. 13 is an illustration of a developer name management table. FIG. 14 is an illustration of an application developer management table. FIG. 15 is an illustration of a development terminal management table.

The developer name management table stores the name of a developer of an application in association with a developer ID for identifying the developer. For example, in the developer name management table illustrated in FIG. 13, it is indicated that the name of a developer whose developer ID is "dv01" is "Company A". Note that a developer in the communication system 1 of the embodiment is permitted to debug an application developed by the developer using a development terminal owned by the developer. In addition, a developer is not particularly limited and may be a person or an organization.

The application developer management table stores a developer ID in association with an application ID for identifying an application. For example, in the application developer management table illustrated in FIG. 14, it is indicated that an application identified by the application ID "a010" is developed by the company A identified by the developer ID "dv01".

The development terminal management table stores the developer ID of a developer who owns a terminal 10 in association with the terminal ID of this terminal 10. For example, in the development terminal management table illustrated in FIG. 15, it is indicated that the terminal 10ac identified by the terminal ID "01ac" is owned by the company A identified by the developer ID "dv01".

(Functional Configuration of Management System)

Next, functional configuration of the communication management system 50 will be described in detail. Note that, in the following description of functional configuration of the communication management system 50, among elements illustrated in FIG. 6, relationships with main elements for realizing functional configuration of the communication management system 50 will also be described.

The data transmitter/receiver 51 is implemented by a command from the CPU 201 illustrated in FIG. 6 and by the network I/F 209 illustrated in FIG. 6, and performs transmission/reception of various types of data (or information) to/from another terminal, apparatus, or system via the communication network 2.

The authenticator 52 is implemented by a command from the CPU 201 illustrated in FIG. 6, and authenticates a terminal 10 by searching the terminal authentication management table (see FIG. 10) using a terminal ID and a password received by the data transmitter/receiver 51 as search keys and determining whether the same terminal ID and the same password are managed in the terminal authentication management table.

The registrar 54 is realized by a command from the CPU 201 illustrated in FIG. 6, and registers various information such as developer IDs, developer names, application IDs, and terminal IDs in the tables of the development terminal management DB 5006.

The activation determiner 55 is implemented by a command from the CPU 201 illustrated in FIG. 6, and determines whether to permit activation of an application requested to be activated.

The data processor 59 is implemented by a command from the CPU 201 illustrated in FIG. 6 and by the HDD 205 illustrated in FIG. 6, or by a command from the CPU 201, and performs processing to store various types of data in the memory 5000 or to extract various types of data stored in the memory 5000.

<Functional Configuration of Application Server>

The application server 80 includes a data transmitter/receiver 81 and a data processor 89. These elements are functions that are realized by operating any of the elements illustrated in FIG. 6 in response to a command from the CPU 201 in accordance with a program for the application server 80, which is expanded from the HD 204 to the RAM 203. In addition, the application server 80 includes a memory 8000 configured by the HD 204 illustrated in FIG. 6.

(Application Hosting DB)

The memory 8000 stores an application hosting DB 8001. The application hosting DB 8001 stores an application developed by a development terminal among the terminals 10 and uploaded to the application server 80.

The data transmitter/receiver 81 is implemented by a command from the CPU 201 illustrated in FIG. 6 and by the network I/F 209 illustrated in FIG. 6, and performs transmission/reception of various types of data (or information) to/from another terminal, apparatus, or system via the communication network 2.

The data processor 89 is implemented by a command from the CPU 201 illustrated in FIG. 6 and by the HDD 205 illustrated in FIG. 6, or by a command from the CPU 201, and performs processing to store various applications in the memory 8000 or to extract various applications stored in the memory 8000.

<<Process or Operation>>

Figure 16:
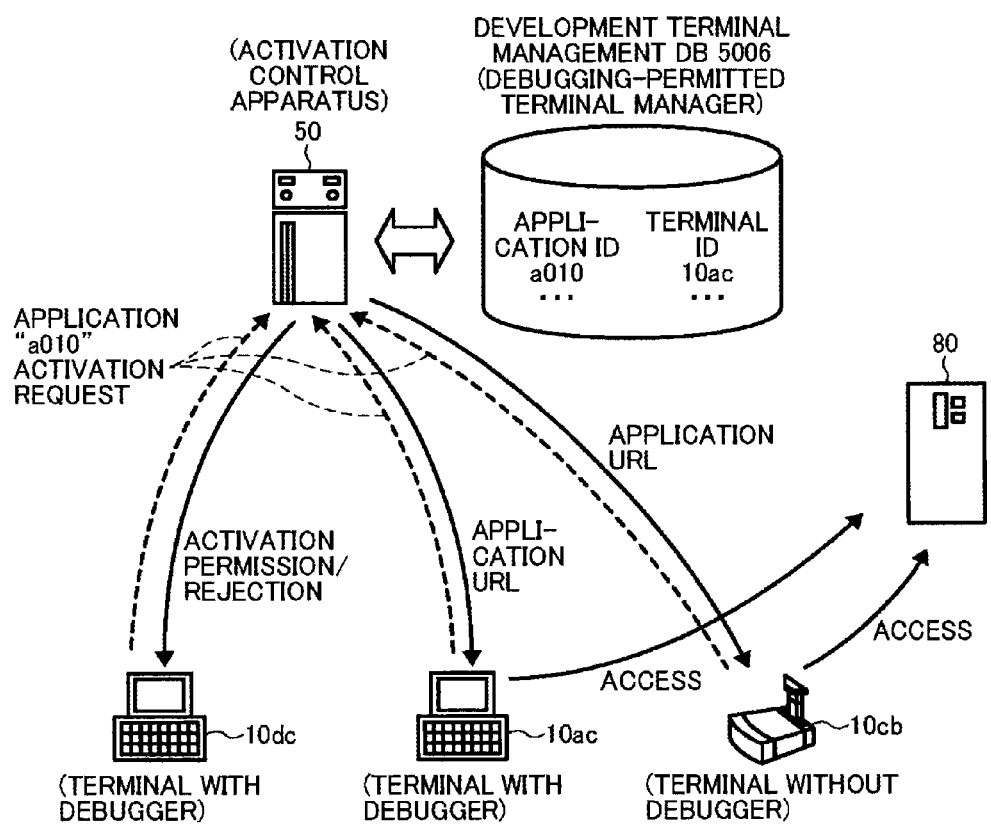
FIG. 16 is an illustration for explaining transmission/reception of various types of information in the communication system.

Next, referring to FIG. 16, the outline of an operation of the embodiment will be described. FIG. 16 is a conceptual diagram illustrating transmission/reception of various types of information in the communication system 1. The management system 50 functions as an activation control apparatus, which controls activation of applications that run on the terminals 10. The management system 50 is further provided with the development terminal management DB 5006 that functions as a debugging-permitted terminal manager, which stores the application developer management table. The application developer management table stores the developer ID (an example of developer identification information) of a developer permitted to debug each application, in association with this application. The development terminal management DB 5006 further stores the development terminal management table, which stores the terminal ID of a development terminal owned by each developer in association with the developer ID of this developer. That is, for each application, the development terminal management DB 5006 manages a development terminal permitted to debug this application. More specifically, the development terminal management DB 5006 stores first association information that associates, for each application, identification information for identifying a communication terminal that is permitted to debug the application.

In response to a request from a development terminal to activate an application, if the application requested to be activated is an application other than an application(s) associated with the terminal ID of this development terminal in the development terminal management DB 5006, the data transmitter/receiver 51 transmits information indicating rejection of activation to the development terminal, which has given the activation request. In contrast, in response to a request from a terminal 10 that is not a development terminal to activate an application, regardless of information managed in the development terminal management DB 5006, the data transmitter/receiver 51 allows activation by transmitting the URL (an example of information for accessing the application) of the application to the terminal 10, which has given the activation request.

With the development terminal management DB 5006, the management system 50 controls not to activate, on a development terminal, applications other than those permitted to be debugged by this development terminal, thereby preventing copying of applications based on debugging.

Further, when an additional terminal is registered in the development terminal management table for management by the management system 50, the management system 50 permits a debugger to be installed on that terminal 10 having a terminal ID that is newly registered. This allows the management system 50 to manage the terminal 10 in which a debugger is installed. Therefore, the activation determiner 55 can determine whether a terminal 10 which has given a request to activate an application is a terminal 10 with a debugger.

Figure 17:
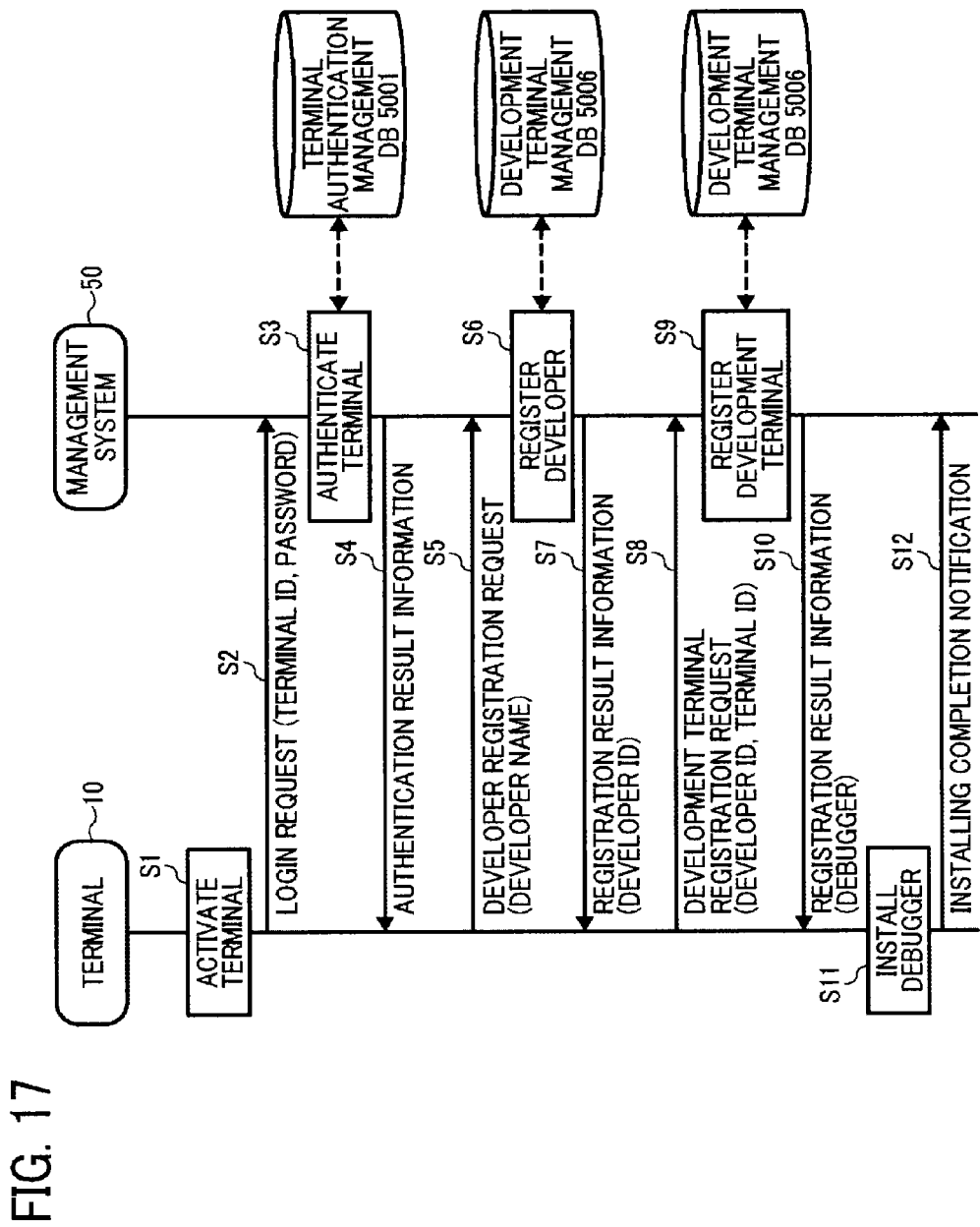
FIG. 17 is a sequence diagram illustrating operation of registering a development terminal, performed by the terminal and the management system, according to an example embodiment of the present invention.

Next, operation of controlling activation of an application is explained according to the embodiment will be described in detail. FIG. 17 is a sequence diagram illustrating example operation of registering a development terminal. In FIG. 17, various items of management information are transmitted/received by the management information session sei illustrated in FIG. 2.

First, when the user turns on the power switch 109 illustrated in FIG. 3, the operation input acceptor 12 illustrated in FIG. 9 accepts the power on operation and activates the terminal 10 (step S1). In response to acceptance of the power on operation, the data transmitter/receiver 11 transmits a login request to the management system 50 via the communication network 2 (step S2). Accordingly, the data transmitter/receiver 51 of the management system 50 accepts the login request. Note that a login request may be given in response to an instruction input from the user of a terminal 10 serving as a login request sender.

The login request includes a terminal ID for identifying the terminal 10, which serves as a request sender, and a password. The terminal ID and the password are read via the data processor 19 from the memory 1000 and sent to the data transmitter/receiver 11. Note that the terminal ID and the password may be input by the user of the terminal 10, which serves as a login request sender. In addition, with login request information from a terminal 10, the management system 50 may receive the IP address of the terminal 10.

At step 3, the authenticator 52 of the management system 50 searches the terminal authentication management table (see FIG. 10) of the memory 5000 using the terminal ID and the password included in the login request information received via the data transmitter/receiver 51 as search keys, and determines whether the same terminal ID and the same password are stored in the terminal authentication management table to authenticate the terminal 10.

The data transmitter/receiver 51 of the management system 50 transmits authentication result information indicating an authentication result obtained by the authenticator 52 to the terminal 10, which is the login request sender, via the communication network 2 (step S4). Accordingly, the data transmitter/receiver 11 of the terminal 10, which is the login request sender, receives the authentication result information. The following explains the case where it has been determined by the authenticator 52 that the terminal 10 is a terminal that has a legitimate use authority.

The data transmitter/receiver 11 of the terminal 10 transmits information that indicates a request for developer registration to the management system 50 via the communication network 2 (step S5). This request includes the developer name "Company A". Accordingly, the data transmitter/receiver 51 of the management system 50 accepts the request for developer registration.

Next, the registrar 54 of the management system 50 generates the developer ID "dv01" indicating the developer, who may be the registration request sender, and registers the developer. More specifically, the registrar 54 stores, in the developer name management table (FIG. 13), the generated developer ID "dv01" in association with the developer name "Company A" transmitted from the registration request sender (step S6). In response to completion of developer registration to the developer name management table of FIG. 13, the data transmitter/receiver 51 transmits registration result information indicating completion of the developer registration to the terminal 10 (step S7). The developer registration result information includes the developer ID "dv01" generated by the registrar 54.

Next, the data transmitter/receiver 11 of the terminal 10 transmits information that indicates a request for development terminal registration to the management system 50 via the communication network 2 (step S8). This request includes the developer ID "dv01" and the terminal ID of a terminal 10 to be registered as a development terminal. Accordingly, the data transmitter/receiver 51 of the management system 50 accepts the request for development terminal registration.

Next, the registrar 54 of the management system 50 registers the development terminal by storing, in the development terminal management table (FIG. 15), the terminal ID of the registration request sender and the developer ID transmitted from the registration request sender in association with each other (step S9). In response to completion of development terminal registration to the development terminal management table of FIG. 15, the data transmitter/receiver 51 transmits development terminal registration result information indicating completion of the registration to the terminal 10 (step S10). The development terminal registration result information includes information necessary for installing a browser with a debugger function (such as the URL of an installer). Accordingly, the terminal 10, which is the registration request sender, is able to install a debugger (step S11) that is obtained using the debugger information.

In response to completion of installing a debugger in the terminal 10, the terminal 10 transmits information indicating that installing of a debugger is completed to the management system 50 (step S12). With this notification, the communication management system 50 knows that the terminal 10, which is registered in the development terminal management table, is a terminal with a debugger. In order to more accurately determine a terminal 10 with a debugger, the registrar 54 of the management system 50 may register the terminal ID in the development terminal management table (FIG. 15) after acceptance of information indicating that installing a debugger is completed. Through operation of FIG. 17, the terminal 10, which is now installed with a debugger, is registered as a development terminal.

Figure 18:
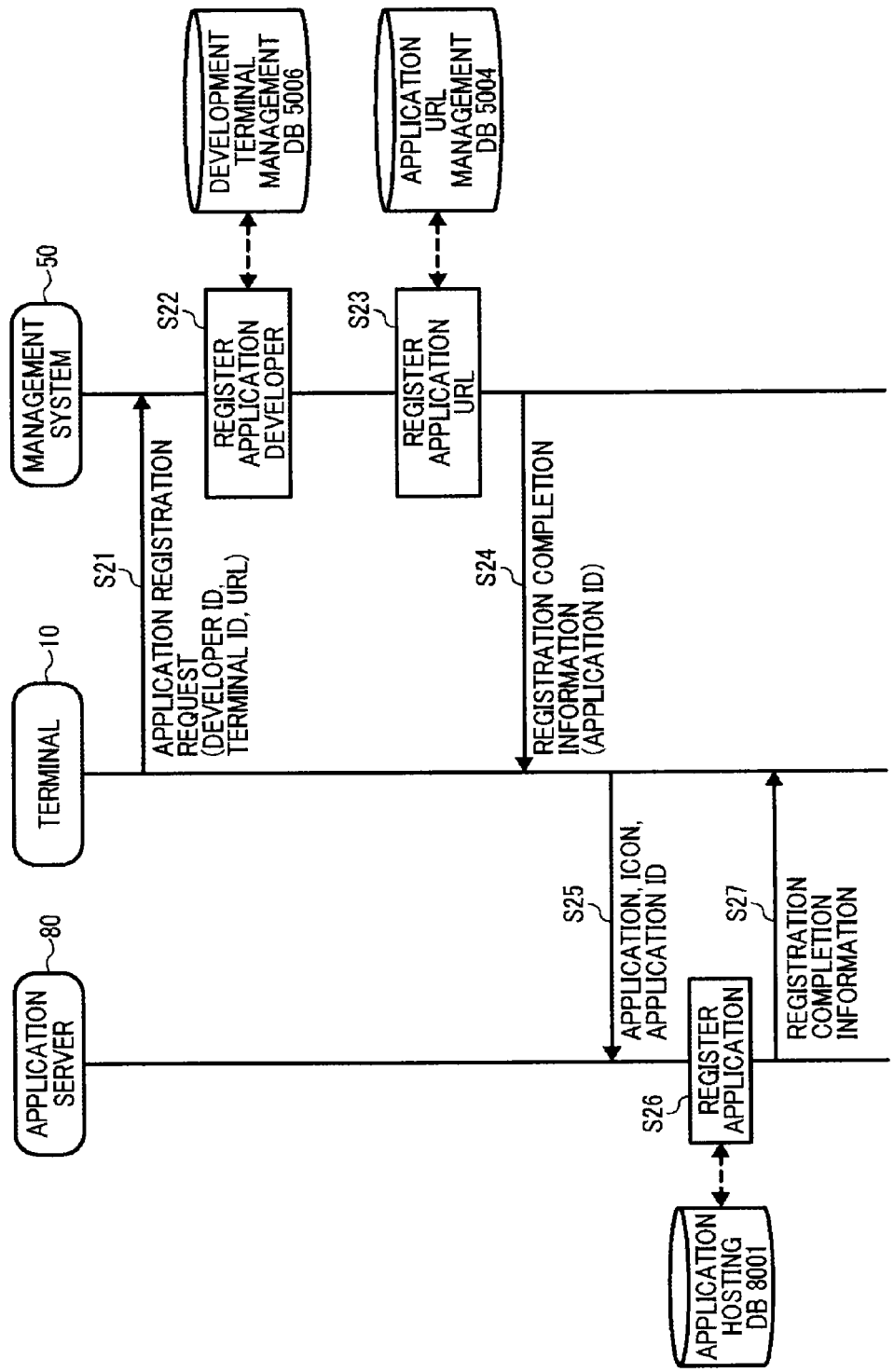
FIG. 18 is a sequence diagram illustrating operation of registering an application, performed by the communication system of FIG. 1, according to an example embodiment of the present invention.

Next, referring to FIG. 18, operation of registering, in the application developer management table (see FIG. 14), an application developed by a terminal 10 that is a development terminal will be described. FIG. 18 is a sequence diagram illustrating operation of registering an application. In FIG. 18, various items of management information are transmitted/received by the management information session sei illustrated in FIG. 2.

First, the data transmitter/receiver 11 of the terminal 10 transmits information that indicates a request for application registration to the management system 50 via the communication network 2 (step S21). This request includes the developer ID "dv01", the terminal ID of the registration request sender, and the URLs of the application server 80 serving as registration destinations of the icon image of an application and a registration destination of the application. Accordingly, the data transmitter/receiver 51 of the management system 50 accepts the request for application registration.

Next, the registrar 54 of the management system 50 generates an application ID for identifying an application developed by the registration request sender, and registers the application developer by storing, in the application developer management table (FIG. 14), the generated application ID in association with the developer ID transmitted from the registration request sender (step S22).

Next, the registrar 54 of the management system 50 stores, in association with the application ID of the application developed by the registration request sender, the URLs of the registration destinations of the icon image of the application and of the application, which is transmitted from the registration request sender, in the application URL management table (FIG. 12), thereby registering the URL of the application (step S23).

In response to completion of the application registration, the data transmitter/receiver 51 transmits registration completion information indicating completion of the registration to the terminal 10, which is the registration request sender (step S24). The registration completion information includes the application ID generated by the registrar 54 at S22. In response to acceptance of the registration completion information by the data transmitter/receiver 11 of the terminal 10, the data transmitter/receiver 11 transmits to the application server 80 requests for registering the application at the URL of the application and registering the image data of the icon at the URL of the image data of the icon (step S25).

In response to acceptance of these requests by the data transmitter/receiver 81 of the application server 80, the data processor 89 registers the application and the image data of the icon, transmitted from the terminal 10, at the specified registration destinations in the application hosting DB 8001 (step S26). In response to completion of the registration, the data transmitter/receiver 81 of the application server 80 transmits registration completion information indicating completion of registration of the application and the icon to the terminal 10, which is the registration request sender.

Figure 19:
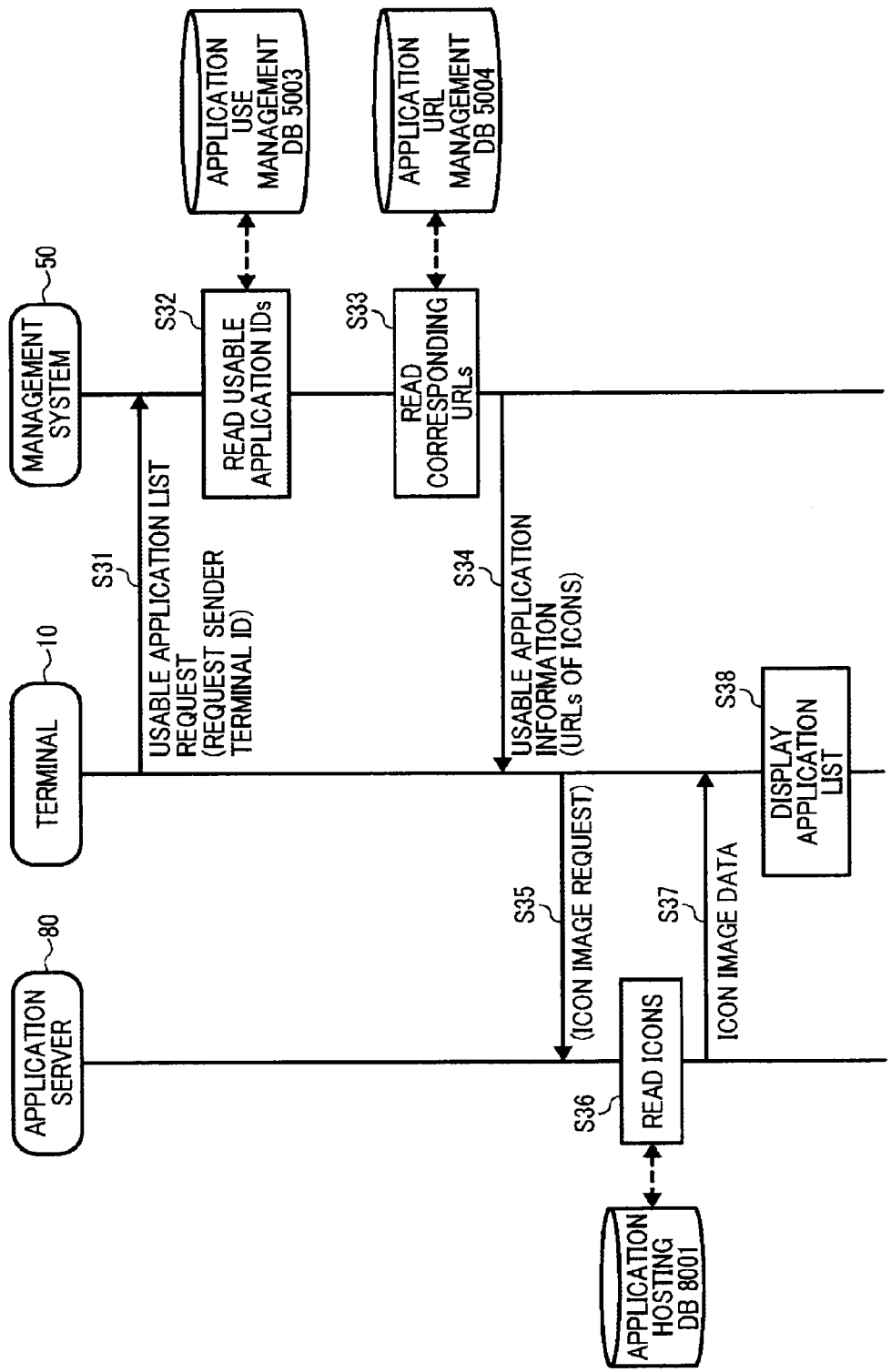
FIG. 19 is a sequence diagram illustrating operation of displaying application icons after activation of a communication terminal, performed by the communication system of FIG. 1, according to an example embodiment of the present invention.

Next, referring to FIG. 19, operation of displaying an application icon indicating a candidate for an application requested to be activated on the terminal 10 will be described. FIG. 19 is a sequence diagram illustrating a process up to displaying an application icon. In FIG. 19 and later-described FIG. 20, various items of management information are transmitted/received entirely by the management information session sei illustrated in FIG. 2.

After the terminal 10 logs in to the management system 50 through processing that is the same as or similar to steps S1 to S4, the data transmitter/receiver 11 of the terminal 10 gives a request for a list of candidates for usable applications to the management system 50 via the communication network 2 (step S31). Accordingly, the data transmitter/receiver 51 of the management system 50 accepts the request for usable applications. This request includes the terminal ID of the terminal 10, which is the list request sender.

Next, the data processor 59 of the management system 50 searches the application use management table (see FIG. 11) by using the terminal ID of the terminal 10, which is the list request sender, received in step S31 described above, as a search key, thereby reading application IDs corresponding to the terminal ID, and their effective period start days and effective period end days (step S32). The data processor 59 further extracts, from among the application IDs read in step S32 described above, an application that is within its effective period (from the effective period start day to the effective period end day) at the time of this processing, and searches the application URL management table (see FIG. 12) by using the extracted application ID as a search key, thereby reading URL information of an icon corresponding to the application ID (step S33).

Next, the data transmitter/receiver 11 transmits, as a list of candidates for usable applications, usable application information to the terminal 10, which is the list request sender, via the communication network 2 (step S34). The usable application information includes the URL information of the icon read in step S33 described above. Accordingly, the data transmitter/receiver 11 of the terminal 10, which is the list request sender, receives the usable application information.

Next, the data transmitter/receiver 11 of the terminal 10 accesses a resource in the application hosting DB 8001, indicated by the URL of the icon received in step S34 described above, and gives a request to obtain the image data of the icon (step S35). Accordingly, the data transmitter/receiver 81 of the application server 80 accepts the request to obtain the image data of the icon.

Next, the data processor 89 of the application server 80 reads the image data of the icon, requested in step S35, from the application hosting DB 8001 of the memory 8000 (step S36). The data transmitter/receiver 81 transmits the image data of the icon to the terminal 10, which is the obtaining request sender, via the communication network 2 (step S37). Accordingly, the data transmitter/receiver 11 of the terminal 10, which is the request sender, receives the image data of the icon.

Figure 21:
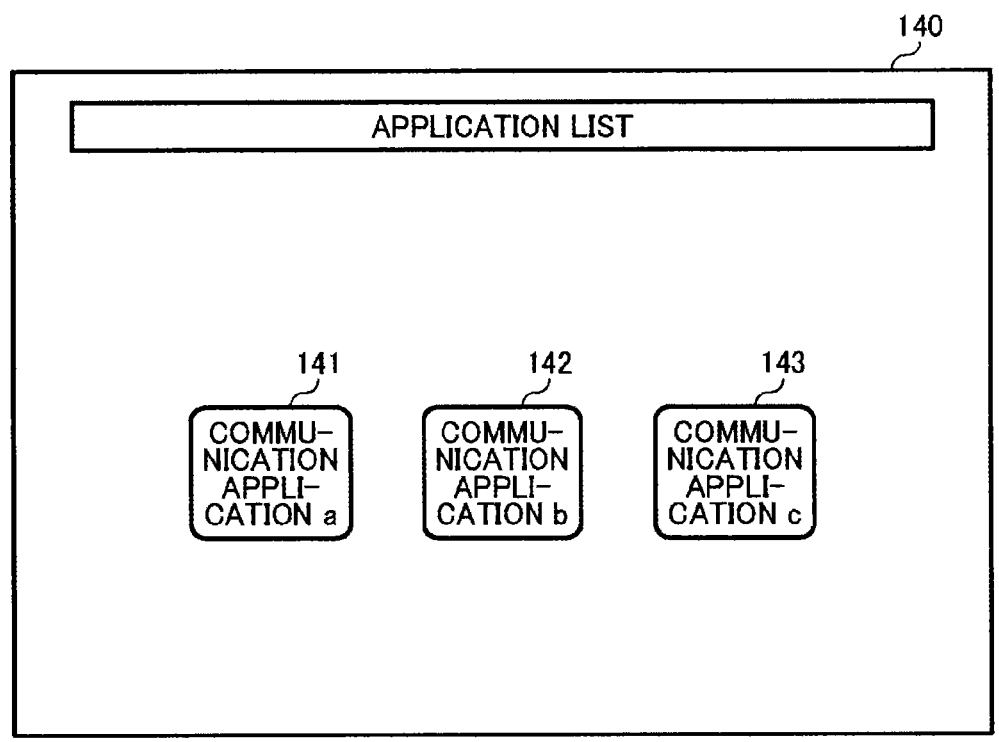
FIG. 21 is an illustration of an exemplary screen of an application list.

Next, the display control 13 displays an "application list" screen 140, such as that illustrated in FIG. 21, on the display 120 (step S38). Note that FIG. 21 is a diagram illustrating an exemplary screen of an application list. On the screen 140, the icon of an application within its effective period is displayed. Here, the icons (141, 142, and 143) of three applications indicated by three application IDs (a001, a002, and a003), respectively, are displayed.

Figure 20:
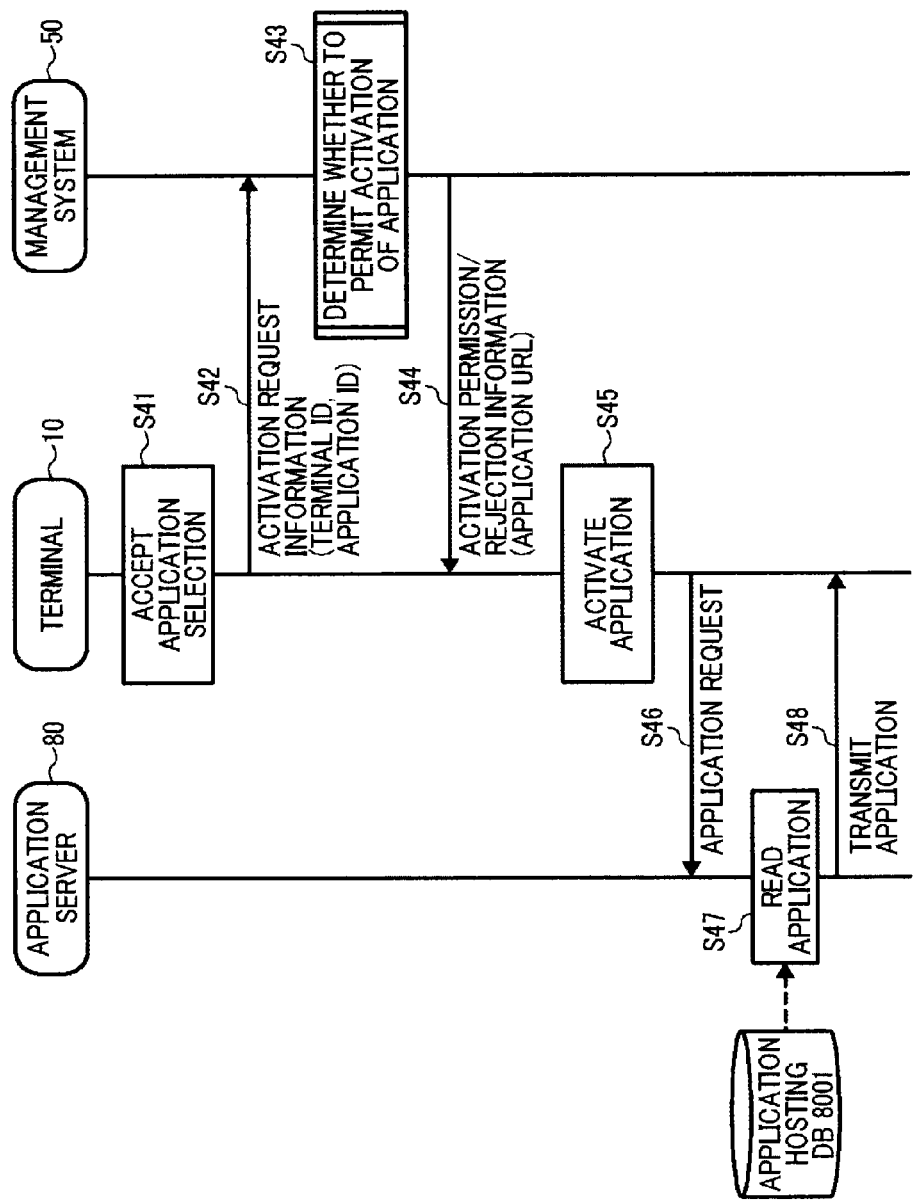
FIG. 20 is a sequence diagram illustrating operation of requesting activation of an application, performed by the communication system of FIG. 1, according to an example embodiment of the present invention.

Next, referring to FIG. 20, operation of requesting activation of a selected application, which is selected using an application icon from an application list will be described. Note that FIG. 20 is a sequence diagram illustrating operation of requesting activation of a selected application.

First, in response to selection of a desired icon from among a plurality of icons displayed in FIG. 21 in response to a user operation, the operation input acceptor 12 of the terminal 10 accepts this selection of an application icon by the user (step S41). Next, the data transmitter/receiver 11 of the terminal 10 transmits activation request information that indicates a request for activation of the selected application to the management system 50 via the communication network 2 (step S42). The activation request information includes the terminal ID of the terminal 10, which is the request sender terminal, and the application ID of the selected application.

Figure 22:
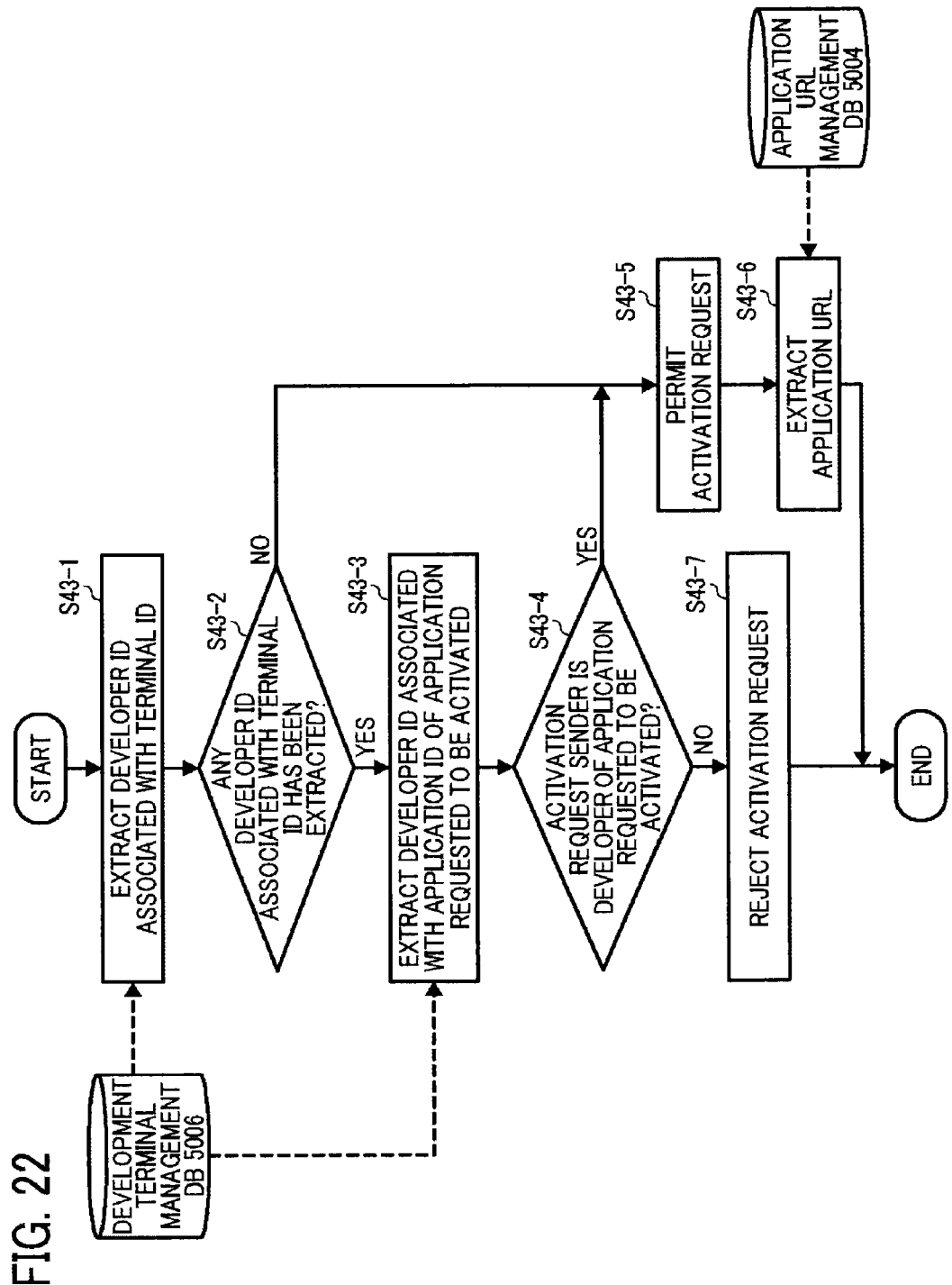
FIG. 22 is a flowchart illustrating operation of determining whether to permit activation of an application, performed by the management system of FIG. 1, according to an example embodiment of the present invention.

The data transmitter/receiver 51 of the management system 50 accepts the activation request by receiving the activation request information. In response to acceptance of the activation request, the activation determiner 55 of the management system 50 determines whether to permit activation of the application requested to be activated (step S43). The processing in step S43 will be described in detail using FIG. 22. FIG. 22 is a flowchart illustrating a process of determining whether to permit activation of an application.

First, the data processor 59 of the management system 50 searches the development terminal management table (see FIG. 15) of the development terminal management DB 5006 by using the terminal ID of the terminal 10, which is the activation request sender, thereby extracting a corresponding developer ID (step S43-1). Next, the activation determiner 55 determines whether the terminal 10, which is the activation request sender, is a development terminal on the basis of whether a developer ID corresponding to the terminal ID of the terminal 10, which is the activation request sender, has been extracted in step S43-1 (step S43-2).

In the case where the terminal 10, which is the activation request sender, is not a development terminal (NO in step S43-2), that is, in the case where no developer ID associated with the terminal ID of the terminal 10 has been extracted in step S43-1, the activation determiner 55 permits activation of the application requested to be activated (step S43-5). This is because the terminal 10, which is the activation request sender, is not a development terminal, and is incapable of debugging the application.

In the case where the terminal 10, which is the activation request sender, is a development terminal (YES in step S43-2), that is, in the case where a developer ID associated with the terminal ID of the terminal 10 has been extracted in step S43-1, the data processor 59 of the management system 50 searches the application developer management table (see FIG. 14) of the development terminal management DB 5006 by using the application ID of the application requested to be activated as a search key, thereby extracting a corresponding developer ID (step S43-3). Next, the activation determiner 55 determines whether the activation request sender is the developer of the application requested to be activated, by comparing the developer ID extracted in step S43-1 with the developer ID extracted in step S43-3 (step S43-4).

In the case where the activation request sender is the developer of the application requested to be activated (YES in step S43-4), that is, in the case where the developer ID extracted in step S43-1 matches the developer ID extracted in step S43-3, the activation determiner 55 permits activation of the application requested to be activated (step S43-5). This is because the application requested to be activated is developed by the activation request sender. In response to permission of the activation request, the data processor 59 searches the application URL management table (see FIG. 12) by using the application ID of the application requested to be activated as a search key, thereby reading URL information corresponding to the application (step S43-6).

In the case where the activation request sender is not the developer of the application requested to be activated (NO in step S43-4), that is, in the case where the developer ID extracted in step S43-1 does not match the developer ID extracted in step S43-3, the activation determiner 55 rejects activation of the application requested to be activated (step S43-7). This is because the application requested to be activated is not developed by the activation request sender.

Referring back to FIG. 20, in response to completion of determination by the activation determiner 55 whether to permit activation of the application, the data transmitter/receiver 51 of the management system 50 transmits activation permission/rejection information indicating whether activation of the application is permitted to the terminal 10, which is the activation request sender (step S44). Note that, in the case where activation is permitted in step S43-5, the URL information of the application, extracted in step S43-6, is also transmitted as the URL for accessing the application requested to be activated.

In response to reception of the activation permission/rejection information by the data transmitter/receiver 11 of the terminal 10, which is the activation request sender, the display control 13 displays the activation permission/rejection information indicating whether activation is permitted, on the display 120. In the case where activation is permitted, the activation requester 14 of the device control 1050 illustrated in FIG. 9 gives an activation command to the activator 22 of the communication control 1060, thereby activating the communication control 1060 (step S45). That is, the application selected by the user is activated. Note that, in the case where the terminal 10, which is the activation request sender, is a development terminal, the application is activated in a debug mode. In this example, the processing prior to activation at S45 is performed by the device control 1050, and the processing after activation at S45 is performed by the communication control 1060.

In response to activation of the application, the data transmitter/receiver 21 accesses the URL of the application, included in the activation permission/rejection information, and requests to download the application (step S46). In response to acceptance by the data transmitter/receiver 81 of the application server 80 of the request to download the application, the data processor 89 reads the application identified by the URL (step S47). The read application is transmitted by the data transmitter/receiver 81 to the terminal 10, which is the download request sender. Accordingly, the terminal 10, which is the activation request sender, is able to run the application on the browser 1021.

Second Embodiment

Figure 23:
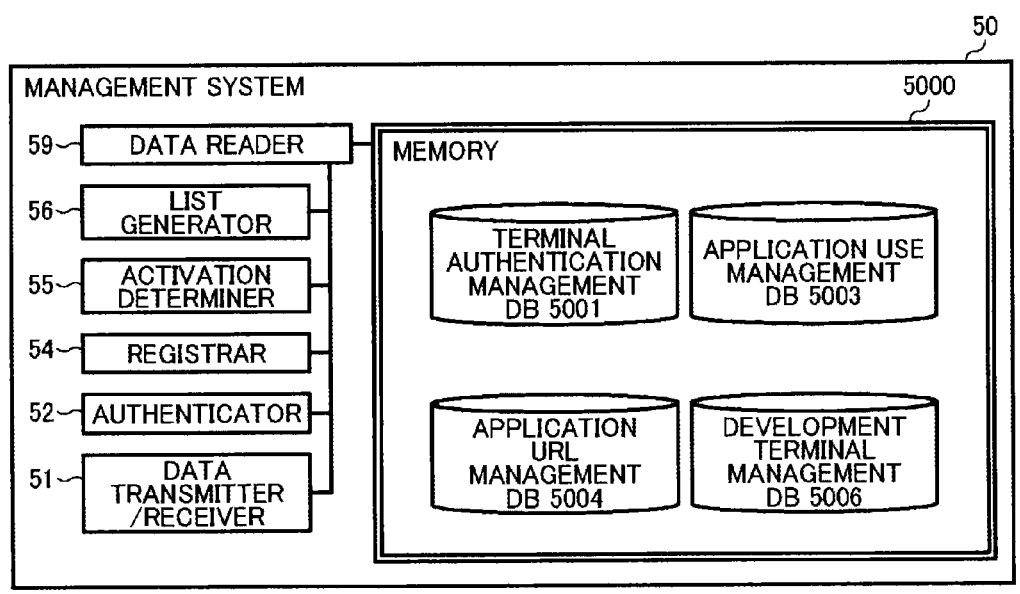
FIG. 23 is a functional block diagram of the communication management system in the communication system of FIG. 1, according to a second embodiment of the present invention.
Figure 24:
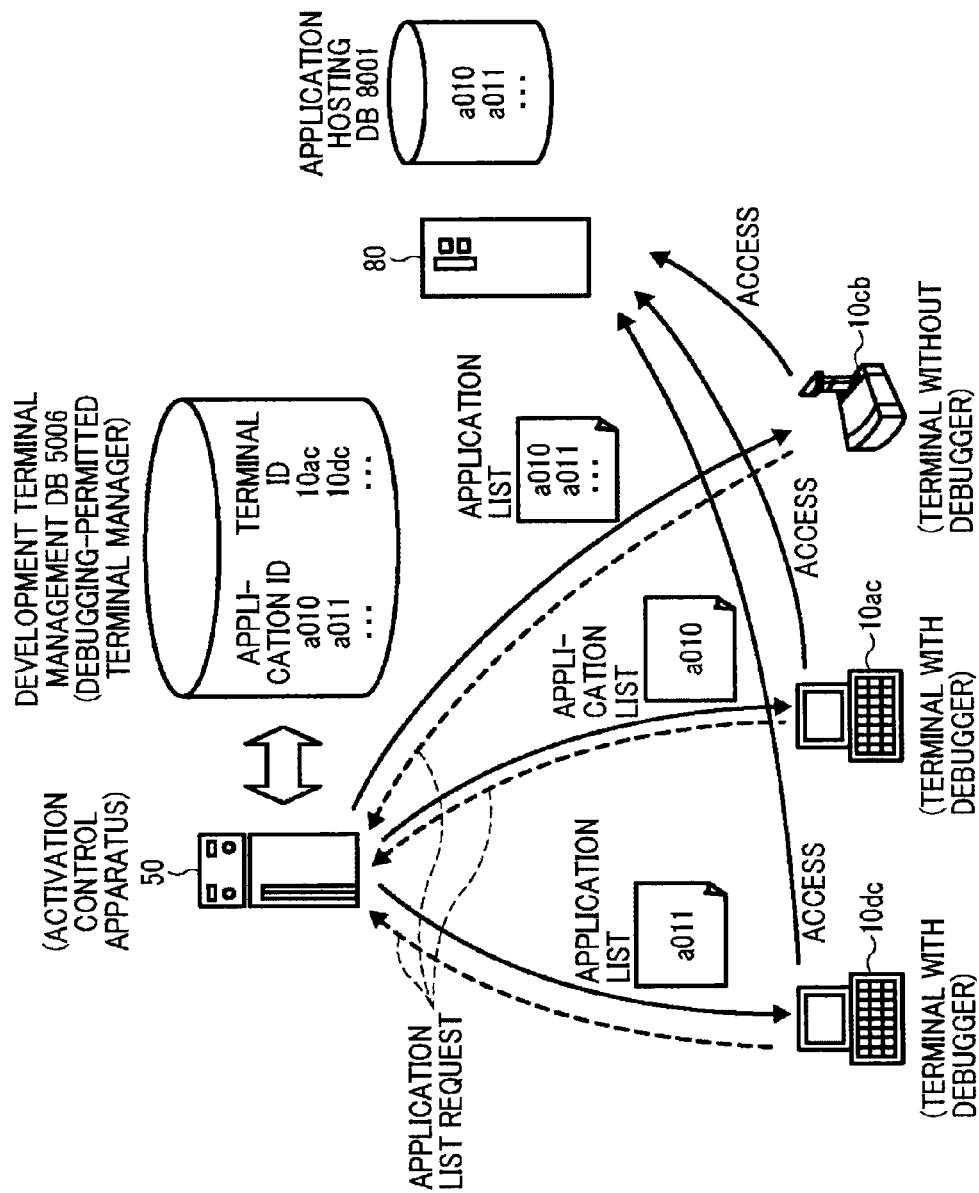
FIG. 24 is an illustration of transmission/reception of various types of information in the communication system of FIG. 1 with the management system of FIG. 23.
Figure 25:
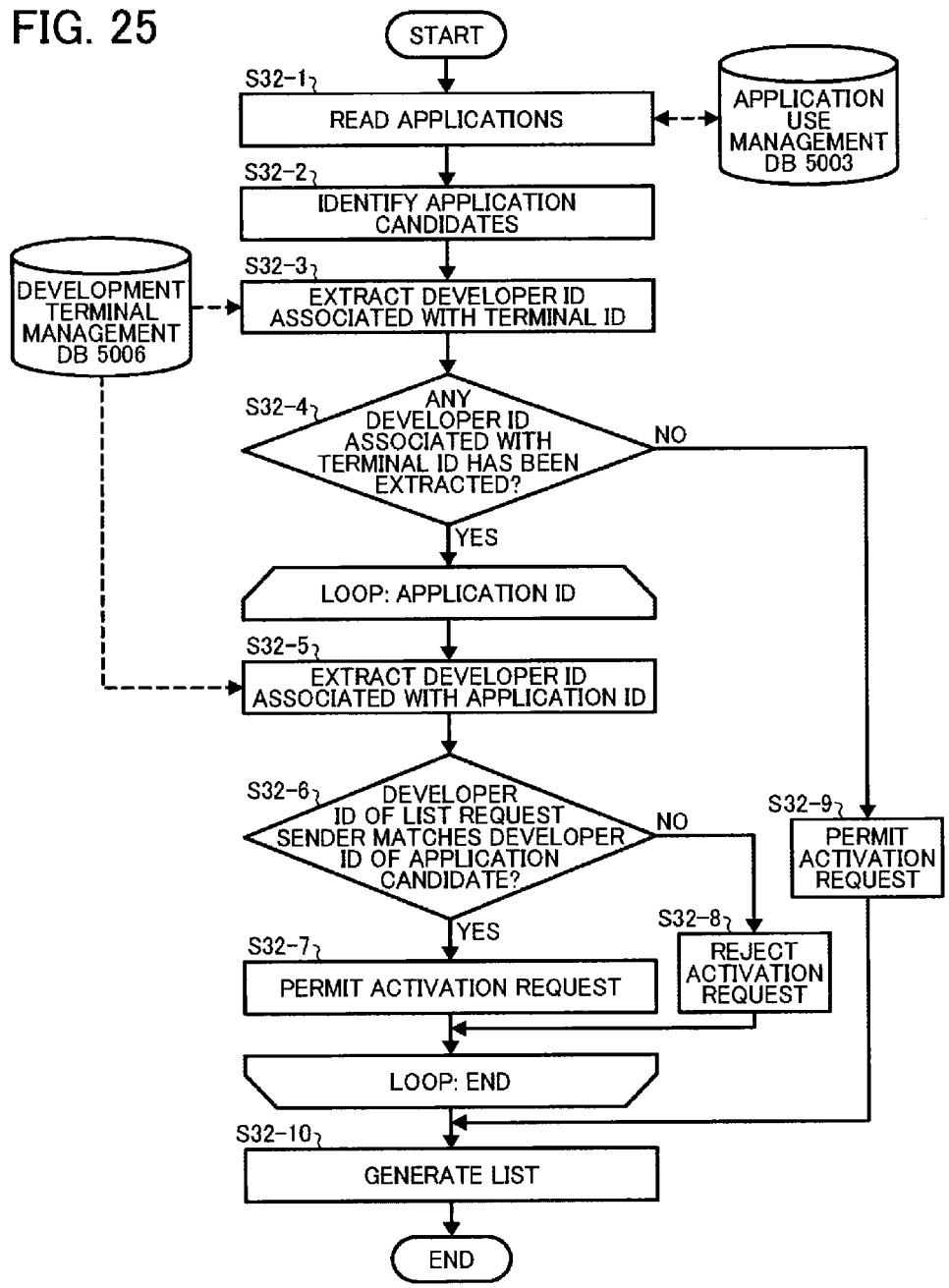
FIG. 25 is a flowchart illustrating operation of generating a list of applications, performed by the management system of FIG. 23, according to an example embodiment of the present invention.

Referring to FIGS. 23 to 25, operation of controlling activation of an application is explained according to a second embodiment of the present invention. The operation of FIGS. 23 to 25 is substantially similar to the above-described operation of FIGS. 16 to 22, except for some differences, which will be described below. The communication system 1 of the second embodiment is different from the first embodiment in that the management system 50 includes a list generator 56, as illustrated in FIG. 23. Note that FIG. 23 is a functional block diagram of the management system 50. The list generator 56 generates a list of applications that can be requested to be activated by a terminal 10.

Referring to FIG. 24, the outline of an operation or a process of the second embodiment will be described. FIG. 24 is a conceptual diagram illustrating transmission/reception of various types of information in the communication system 1. In the second embodiment, in step S32, after application IDs corresponding to the terminal ID of a terminal 10 that serves as a list request sender are read, the list generator 56 identifies, from among the read application IDs, application candidates to be included in the list by excluding application IDs that are not within their effective periods at the time of processing.

In the case of generating a list of applications that can be requested to be activated by a development terminal, the list generator 56 (an example of an application list generator) of the management system 50 generates a list by excluding applications other than those associated with the terminal ID of the development terminal in the development terminal management DB 5006 from application candidates to be included in the list. In contrast, in the case of generating a list of applications that can be requested to be activated by a terminal 10 that is not a development terminal, the list generator 56 generates a list without excluding applications managed in the development terminal management DB 5006 from application candidates to be included in the list.

With the development terminal management DB 5006, the management system 50 is able to exclude, from application candidates that can be requested to be activated by a development terminal, applications other than those permitted to be debugged by the development terminal. Accordingly, applications that can be activated by a terminal 10 with a debugger can be restricted, thereby preventing copying of applications.

Next, referring to FIG. 25, the outline of an operation or a process of the second embodiment will be described. FIG. 25 is a flowchart illustrating operation of generating a list of applications. In the second embodiment, the processing in step S32 (FIG. 19) of the first embodiment is changed to a series of processes illustrated in FIG. 25.

First, the data processor 59 of the management system 50 searches the application use management table (see FIG. 11) by using the terminal ID of the terminal 10, which is the list request sender, as a search key, thereby reading application IDs corresponding to the terminal ID, and their effective period start days and effective period end days (step S32-1). Next, the list generator 56 identifies, from among the read application IDs, application candidates to be included in the list by excluding application IDs that are not within their effective periods at the time of processing (step S32-2).

Next, the data processor 59 of the management system 50 searches the development terminal management table (see FIG. 15) of the development terminal management DB 5006 by using the terminal ID of the list request sender as a search key, thereby extracting a corresponding developer ID (step S32-3). Next, the list generator 56 determines whether the terminal 10, which is the list request sender, is a development terminal on the basis of whether a developer ID corresponding to the terminal ID of the list request sender has been extracted in step S32-2 (step S32-4).

In the case where the terminal 10, which is the list request sender, is not a development terminal (NO in step S32-4), that is, in the case where no developer ID associated with the terminal ID of the terminal 10 has been extracted in step S32-3, the list generator 56 includes all the application candidates identified in step S32-2 in the list of applications that can be requested to be activated by the terminal 10 (step S32-9).

In the case where the terminal 10, which is the list request sender, is a development terminal (YES in step S32-4), that is, in the case where a developer associated with the terminal ID of the terminal 10 has been extracted in step S32-3, the data processor 59 extracts, for each of the application IDs of the application candidates identified in step S32-2, a corresponding developer ID by searching the application developer management table (see FIG. 14) by using this application ID as a search key (step S32-5). Next, the list generator 56 determines whether the list request sender is the developer of each of the application candidates to be included in the list, by comparing the developer ID extracted in step S32-3 with a corresponding one of the developer IDs extracted in step S32-5 (step S32-6).

In the case where the list request sender is the developer of the application candidate (YES in step S32-6), that is, in the case where the developer ID extracted in step S32-3 matches the developer ID extracted in step S32-5, the list generator 56 includes the application candidate in the list of applications that can be requested to be activated (step S32-7).

In the case where the list request sender is not the developer of the application candidate (NO in step S32-6), that is, in the case where the developer ID extracted in step S32-3 does not match the developer ID extracted in step S32-5, the list generator 56 does not include the application candidate in the list of applications that can be requested to be activated (step S32-8).

In response to completion of determination of whether to include each application in the list, the list generator 56 generates the list of applications that can be requested to be activated by the terminal 10 by using the application ID(s) determined to be included in the list (step S32-10).

In response to completion of the list, the data processor 59 searches the application URL management table (see FIG. 12) by using each of the application IDs included in the list, generated in step S32 described above, as a search key, thereby reading the URL information of an icon corresponding to this application ID (step S33). Since the processing from this point onward is the same as the first embodiment, a description thereof is omitted.

Third Embodiment

Figure 26:
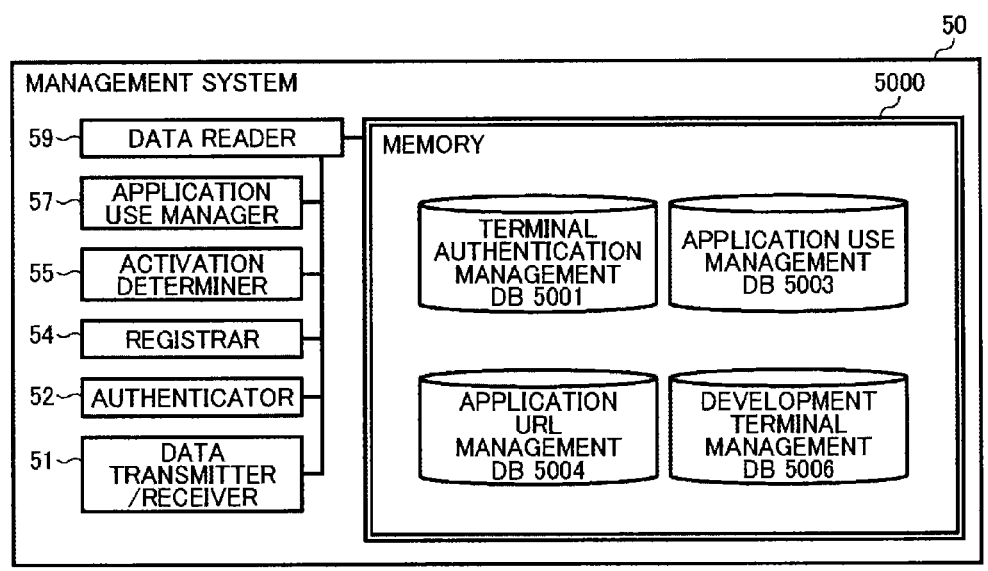
FIG. 26 is a functional block diagram of the communication management system in the communication system of FIG. 1, according to a third embodiment of the present invention.
Figure 27:
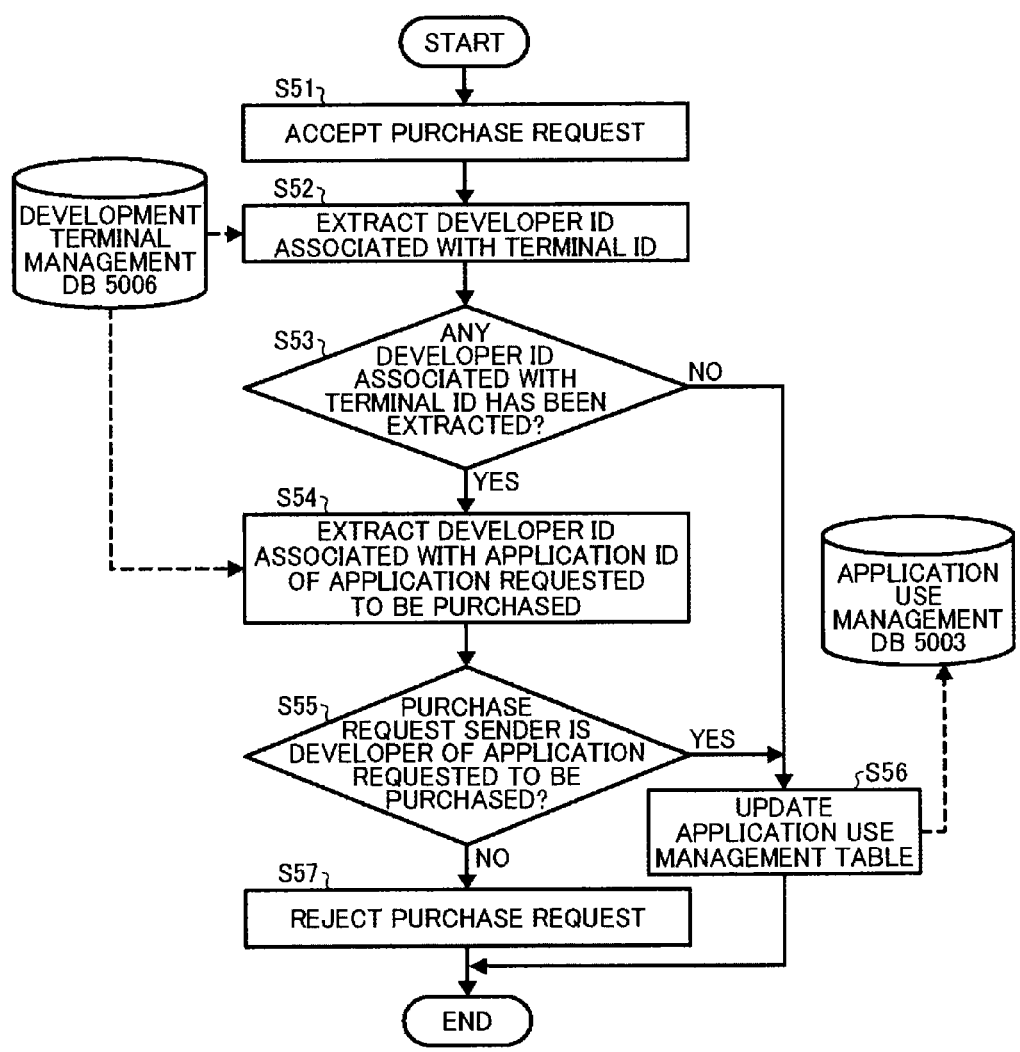
FIG. 27 is a flowchart illustrating operation of updating the application use management table, performed by the management system of FIG. 26, according to an example embodiment of the present invention.

Referring to FIGS. 26 and 27, operation of controlling activation of an application is explained according to a third embodiment of the present invention. The operation of FIGS. 26 to 27 is substantially similar to the above-described operation of FIGS. 16 to 22 or the operation of FIGS. 23 to 25, except for some differences. The third embodiment is different from the first embodiment or the second embodiment in that the management system 50 includes an application use manager 57, as illustrated in FIG. 26. FIG. 26 is a functional block diagram of the management system 50. The application use manager 57 updates various types of information recorded in the application use management DB 5003. In the third embodiment, in response to a purchase of an application from a terminal 10, the terminal ID, application ID, and effective period are updated in the application use management DB 5003 on the basis of conditions of purchase. Also in the third embodiment, in response to a purchase of an application from a terminal 10, it becomes possible for the terminal 10 to use the purchased application within a specified effective period on the basis of conditions of purchase.

First, the outline of an operation or a process of the third embodiment will be described. The application use management DB 5003 (an example of an application manager, see FIG. 11) stores, in association with each terminal 10, the application ID (an example of application information) of an application purchased by that terminal 10. More specifically, the application use management DB 5003 stores second association information that associates terminal identification information of the terminal with application information indicating one or more applications that can be used by the terminal. The data transmitter/receiver 51 accepts, from a terminal 10, a request for purchase of a desired application (an example of a request to enable the use of an application).

In response to acceptance of a request for purchase from a development terminal, the application use manager 57 (an example of an updater) rejects the request for purchase of a desired application in the case where the terminal ID of the development terminal serving as a purchase request sender is not managed in association with the desired application in the development terminal management DB 5006. In contrast, in response to acceptance of a request for purchase from a terminal 10 that is not a development terminal, the application use manager 57 associates and manages the application ID of a desired application as an application that can be used by this terminal 10, thereby updating the application use management DB 5003. Accordingly, applications that can be purchased by a terminal 10 with a debugger can be restricted, thereby preventing copying of applications by activating the purchased applications in a debugger mode.

Next, referring to FIG. 27, the outline of an operation or a process of the third embodiment will be described. FIG. 27 is a flowchart illustrating operation of updating an application use management table. First, the data transmitter/receiver 51 of the management system 50 accepts a request for purchase of a desired application from a terminal 10 (step S51). Next, the data processor 59 of the management system 50 searches the development terminal management table (see FIG. 15) of the development terminal management DB 5006 by using the terminal ID of the terminal 10, which is the purchase request sender, as a search key, thereby extracting a corresponding developer ID (step S52). Next, the application use manager 57 determines whether the terminal 10, which is the purchase request sender, is a development terminal on the basis of whether a developer ID corresponding to the terminal ID of the purchase request sender has been extracted in step S52 (step S53).

In the case where the terminal 10, which is the purchase request sender, is not a development terminal (NO in step S53), that is, in the case where no developer ID associated with the terminal ID of the terminal 10 has been extracted in step S52, the application use manager 57 updates the application use management table (step S56). In this case, the application use manager 57 updates the application use management table by storing the application ID of the desired application in association with the terminal ID of the terminal 10, which is the purchase request sender. In addition, the application use manager 57 updates the application use management table by managing the effective period start day and the effective period end day, which are based on conditions of purchase, in association with the terminal ID of the terminal 10, which is the purchase request sender, and the application ID of the desired application.

In the case where the terminal 10, which is the purchase request sender, is a development terminal (YES in step S53), that is, in the case where a developer ID associated with the terminal ID of the terminal 10 has been extracted in step S52, the data processor 59 of the management system 50 searches the application developer management table (see FIG. 14) of the development terminal management DB 5006 by using the application ID of the desired application requested to be purchased as a search key, thereby extracting a corresponding developer ID (step S54). Next, the application use manager 57 determines whether the purchase request sender is the developer of the desired application requested to be purchased, by comparing the developer ID extracted in step S52 with the developer ID extracted in step S54 (step S55).

In the case where the purchase request sender is the developer of the desired application requested to be purchased (YES in step S55), that is, in the case where the developer ID extracted in step S52 matches the developer ID extracted in step S54, the application use manager 57 updates the application use management table, as in step S56 described above (step S56).

In the case where the purchase request sender is not the developer of the desired application requested to be purchased (NO in step S55), that is, in the case where the developer ID extracted in step S52 does not match the developer ID extracted in step S54, the application use manager 57 rejects the purchase of the application (step S57).

The determination result indicating whether the purchase of the application is permitted is transmitted by the data transmitter/receiver 51 to the terminal 10, which is the purchase request sender.

Fourth Embodiment

Figure 28:
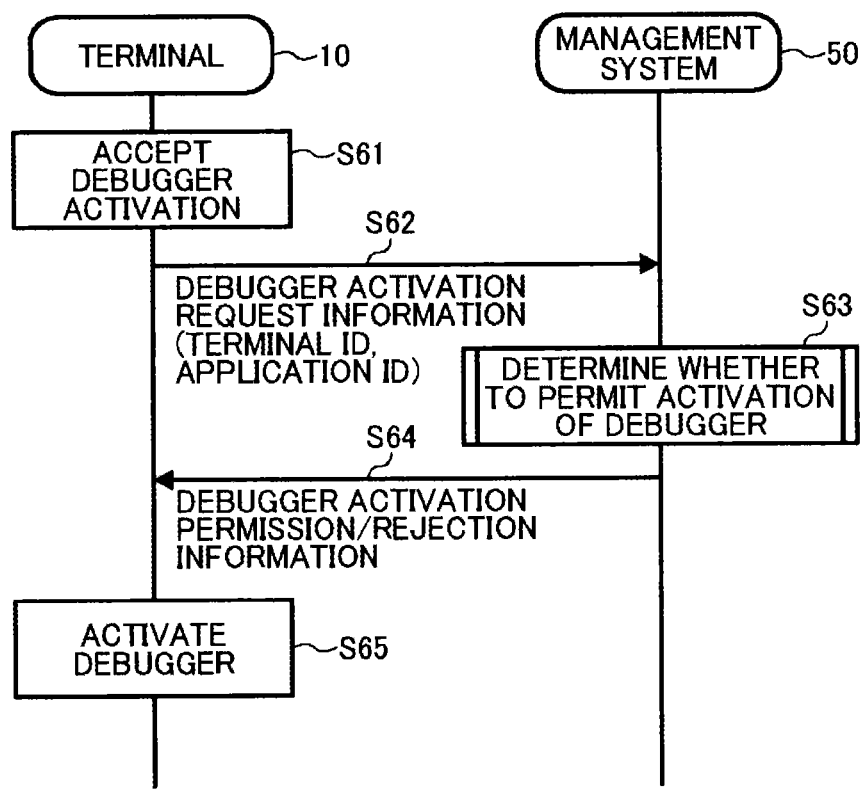
FIG. 28 is a sequence diagram illustrating operation of activating a debugger, performed by the terminal and the management system of the communication system of FIG. 1, according to an example embodiment of the present invention.
Figure 29:
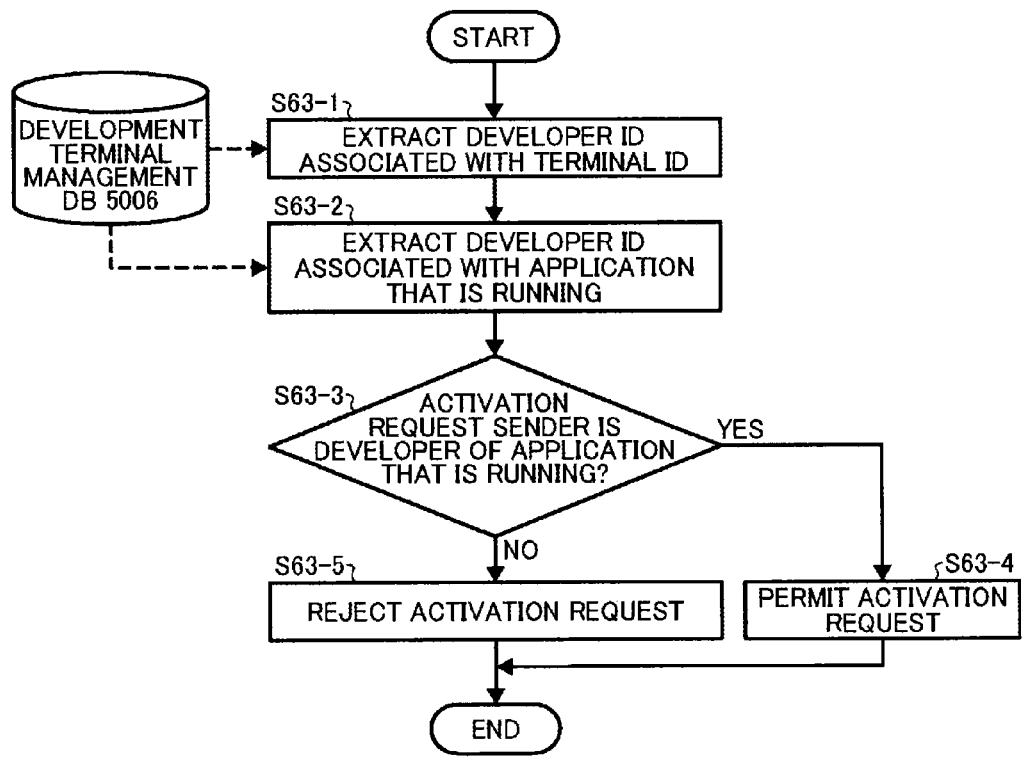
FIG. 29 is a flowchart illustrating operation of determining whether to permit activation of a debugger, performed by the management system of the communication system 1, according to an example embodiment of the present invention.

Referring to FIGS. 28 and 29, operation of controlling activation of an application is explained according to a fourth embodiment of the present invention. In the fourth embodiment, a development terminal activates an application without functioning a debugger. In such case, the management system 50 does not determine whether to permit application activation in step S43 of the first embodiment, and performs control to activate an application requested to be activated. In response to a request for activation of a debugger from a development terminal after activation of an application, the management terminal 50 determines whether to permit activation of a debugger.

Next, referring to FIG. 28, the outline of an operation or a process of the fourth embodiment will be described. FIG. 28 is a sequence diagram illustrating operation of activating a debugger. First, while an application is running on a development terminal, in response to acceptance of a request for activation of a debugger by the operation input acceptor 12 (step S61), the data transmitter/receiver 11 transmits to the management system 50 debugger activation request information including the terminal ID of a terminal 10 that serves as the debugger activation request sender and the application ID of the application that is running (step S62).

The data transmitter/receiver 51 of the management system 50 accepts the debugger activation request by receiving the debugger activation request information. In response to acceptance of the debugger activation request, the activation determiner 55 of the management system 50 determines whether to permit activation of the debugger requested to be activated (step S63). The processing in step S63 will be described referring to FIG. 29. FIG. 29 is a flowchart illustrating a process of determining whether to permit activation of a debugger.

First, the data processor 59 of the management system 50 searches the development terminal management table (see FIG. 15) of the development terminal management DB 5006 by using the terminal ID of the debugger activation request sender as a search key, thereby extracting a corresponding developer ID (step S63-1).

Next, the data processor 59 of the management system 50 searches the application developer management table (see FIG. 14) of the development terminal management DB 5006 by using the application ID of the application running on the debugger activation request sender, thereby extracting a corresponding developer ID (step S63-2). Next, the activation determiner 55 determines whether the debugger activation request sender is the developer of the application running on the debugger activation request sender, by comparing the developer ID extracted in step S63-1 with the developer ID extracted in step S63-2 (step S63-3).

In the case where the debugger activation request sender is the developer of the application activated on the debugger activation request sender (YES in step S63-3), that is, in the case where the developer ID extracted in step S63-1 matches the developer ID extracted in step S63-2, the activation determiner 55 permits activation of the debugger (step S63-4).

In the case where the debugger activation request sender is not the developer of the application activated on the debugger activation request sender (NO in step S63-3), that is, in the case where the developer ID extracted in step S63-1 does not match the developer ID extracted in step S63-2, the activation determiner 55 rejects activation of the debugger (step S63-5).

In response to completion of determination by the activation determiner 55 whether to permit activation of the debugger, the data transmitter/receiver 51 of the management system 50 transmits activation permission/rejection information indicating whether activation of the debugger is permitted to the development terminal, which is the debugger activation request sender (step S64).

In response to reception of the debugger activation permission/rejection information by the data transmitter/receiver 11 of the terminal 10, which is the debugger activation request sender, the display control 13 displays the debugger activation permission/rejection information indicating whether activation of the debugger is permitted, on the display 120. In the case where activation of the debugger is permitted, the activation requester 14 of the device control 1050 illustrated in FIG. 9 gives a command to activate the debugger to the activator 22 of the communication control 1060, thereby activating the debugger (step S65). Accordingly, the use who is the developer at the terminal 10 is able to debug the application that is running.

As has been described above, according to the above-described embodiment, the activation control apparatus manages, in association with each application, a communication terminal permitted to debug this application. Accordingly, the management system is able to control so as not to activate, on a communication terminal with a debugger, applications other than those permitted to be debugged. This prevents copying of applications based on debugging.

For example, assuming that an application, which is released, may be installed onto any communication terminal. If the application is activated on a communication terminal with a debugger, a developer of such communication terminal can not only check the contents of the application, but can easily copy such application. According to the above-described embodiment, control is performed not to activate applications other than those permitted to be debugged, thereby preventing copying of applications through debugging.

The relay devices 30, the management system 50, the program providing system 90, and the maintenance system 100 in the above-described embodiments may be configured by a single computer or a plurality of computers to which divided portions (functions) are arbitrarily allocated. In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a compact disc read-only memory (CD-ROM) storing the terminal program, relay device program, or communication management program in the above-described embodiments, the HD 204 storing these programs, and the program providing system 90 including the HD 204 are each used in the case where the terminal program, relay device program, or communication management program is provided as a program product to users within a certain country or outside that country.

Further, each ID in the above-described embodiments indicates identification information, which may be expressed in the form of any language, a character(s), a symbol(s), or various marks as long as such identification information can uniquely identify a corresponding device. In addition, each ID may be identification information including a combination of at least two of the above-mentioned character(s), symbol(s), and various marks.

For example, an application ID is an example of application identification information, and the application identification information includes the name of the application, besides the application ID. In addition, a terminal ID is an example of terminal identification information, and the terminal identification information includes the serial number of the terminal 10 and a user ID allocated to the user of the terminal 10, besides the terminal ID.

In addition, icons illustrated in FIG. 21 may include characters, picture symbols, or picture symbols including characters or symbols.

In addition, although videoconference terminals have been described as examples of the terminals 10 in the above description, the embodiments are not limited thereto. For example, one or both of a request sender terminal and a counterpart terminal may be IP phones, Internet phones, or PCs. Further, the communication terminals may be information processing terminals, such as smart phones, tablet terminals, game machines, or car navigation apparatuses, which can perform not only communication but also various types of data communication other than communication. In this case, the communication management system 50 executes various processes as a communication management system.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An activation control apparatus that controls activation of a plurality of application that can be activated on a plurality of communication terminals, the apparatus comprising:
a memory that stores first association information that associates, for each one of the plurality of applications, application identification information for identifying an application with terminal identification information for identifying a communication terminal permitted to debug the application;
a receiver that receives an activation request for activating a first application of the plurality of applications from a first communication terminal of the plurality of communication terminals; and
processing circuitry that determines whether the first communication terminal is provided with a debugger, wherein, when the first communication terminal is provided with a debugger, the processing circuitry further determines whether the first communication terminal is permitted to debug the first application using the first association information, and rejects the activation request when the first communication terminal is not permitted to debug the application, and
when the first communication terminal is not provided with a debugger, the processing circuitry accepts the activation request to allow the first communication terminal to activate the first application on the first communication terminal,
wherein the first association information includes
association information that associates, for each one of the plurality of applications, developer identification information for identifying a developer permitted to debug the application with the application identification information of the application; and
association information that associates the developer identification information of the developer with the terminal identification information for identifying a communication terminal owned by the developer, and
wherein, in response to a registration request for registering an additional communication terminal as a communication terminal owned by the developer,
the processing circuitry requests the additional communication terminal to install a debugger, and additionally stores terminal identification information for identifying the additional communication terminal in association with the developer identification information of the developer.

2. The activation control apparatus of claim 1, further comprising:
a transmitter that sends information used for accessing the first application to the first communication terminal, when the activation request is accepted.

3. The activation control apparatus of claim 2, wherein
the memory further stores second association information that associates, for each one of the plurality of communication terminals, terminal identification information of the communication terminal with application information indicating one or more applications available for use by the communication terminal, and
the transmitter sends information indicating one or more applications that are associated with identification information for identifying the first communication terminal to the first communication terminal, wherein the first application that is requested for activation by the first communication terminal is selected from the one or more applications associated with the identification information of the first communication terminal.

4. The activation control apparatus of claim 3, wherein
the receiver receives a use request to enable use of a second application of the plurality of communication terminals from the first communication terminal, the second application being an application that is not associated with the first communication terminal by the second association information, and
wherein, when the first communication terminal is provided with a debugger, the processing circuitry further determines whether the first communication terminal is permitted to debug the second application using the first association information, and rejects the use request when the first communication terminal is not permitted to debug the second application, and
when the first communication terminal is not provided with a debugger, the processing circuitry accepts the use request, and updates the second association information to associate the second application with the first communication terminal.

5. The activation control apparatus of claim 1, wherein the processing circuitry determines whether the first communication terminal is provided with a debugger, based on a determination of whether terminal identification information of the first communication terminal is associated with any developer identification information.

6. A communication system comprising:
the activation control apparatus of claim 1; and
the first communication terminal that sends the activation request to the activation control apparatus through a network.

7. The communication system of claim 6, further comprising:
an application server including a memory that stores the plurality of applications,
wherein the activation control apparatus sends information used for accessing the first application to the first communication terminal, when the first communication terminal is not provided with a debugger, or when the first communication terminal is provided with a debugger and is permitted to debug the first application.

8. A method of controlling activation of a plurality of applications that can be activated on a plurality of communication terminals, comprising:
storing in a memory first association information that associates, for each one of the plurality of applications, application identification information for identifying an application with terminal identification information for identifying a communication terminal permitted to debug the application;
receiving an activation request for activating a first application of the plurality of applications from a first communication terminal of the plurality of communication terminals;
determining whether the first communication terminal is provided with a debugger to generate a first determination result;
determining whether the first communication terminal is permitted to debug the first application using the first association information to generate a second determination result, when the first determination result indicates that the first communication terminal is provided with a debugger; and
controlling activation of the first application on the first communication terminal based on the first determination result, and the second determination result when generated,
wherein, the controlling includes
rejecting the activation request based on the second determination result indicating that the first communication terminal is not permitted to debug the first application, and
accepting the activation request based on the first determination result indicating that the first communication terminal is not provided with a debugger or the second determination result indicating that the first communication terminal is permitted to debug the first application to allow the first communication terminal to activate the first application on the first communication terminal,
wherein the first association information includes
association information that associates, for each one of the plurality of applications, developer identification information for identifying a developer permitted to debug the application with the application identification information of the application; and
association information that associates the developer identification information of the developer with the terminal identification information for identifying a communication terminal owned by the developer,
wherein, in response to a registration request for registering an additional communication terminal as a communication terminal owned by the developer, the method further comprising;
requesting the additional communication terminal to install a debugger; and
additionally storing terminal identification information for identifying the additional communication terminal in association with the developer identification information of the developer.

9. The activation control method of claim 8, further comprising:
sending information used for accessing the first application to the first communication terminal, when the activation request is accepted.

10. The activation control method of claim 9, further comprising:
storing in the memory second association information that associates, for each one of the plurality of communication terminals, terminal identification information of the communication terminal with application information indicating one or more applications available for use by the communication terminal; and
sending information indicating one or more applications that are associated with identification information for identifying the first communication terminal to the first communication terminal, wherein the first application that is requested for activation by the first communication terminal is selected from the one or more applications associated with the identification information of the first communication terminal.

11. The activation control method of claim 10, further comprising:
receiving a use request to enable use of a second application of the plurality of communication terminals from the first communication terminal, the second application being an application that is not associated with the first communication terminal by the second association information;
determining whether the first communication terminal is permitted to debug the second application using the first association information to generate a third determination result, when the first determination result indicates that the first communication terminal is provided with a debugger;
rejecting the use request based on the third determination result indicating that the first communication terminal is not permitted to debug the second application, and
accepting the use request based on the first determination result indicating that the first communication terminal is not provided with a debugger or the third determination result indicating that the first communication terminal is permitted to debug the second application to update the second association information to associate the second application with the first communication terminal.

12. The activation control method of claim 8, wherein the determining whether the first communication terminal is provided with a debugger includes
determining whether terminal identification information of the first communication terminal is associated with any developer identification information.

13. A non-transitory recording medium storing a plurality of instructions which, when executed, cause one or more processors to perform a method of controlling activation of a plurality of applications that can be activated on a plurality of communication terminals, the method comprising:
storing first association information that associates, for each one of the plurality of applications, application identification information for identifying an application with terminal identification information for identifying a communication terminal permitted to debug the application;

receiving an activation request for activating a first application of the plurality of applications from a first communication terminal of the plurality of communication terminals;

determining whether the first communication terminal is provided with a debugger to generate a first determination result;

determining whether the first communication terminal is permitted to debug the first application using the first association information to generate a second determination result, when the first determination result indicates that the first communication terminal is provided with a debugger; and controlling activation of the first application on the first communication terminal based on the first determination result, and the second determination result when generated, wherein, the controlling includes
rejecting the activation request based on the second determination result indicating that the first communication terminal is not permitted to debug the first application, and accepting the activation request based on the first determination result indicating that the first communication terminal is not provided with a debugger or the second determination result indicating that the first communication terminal is permitted to debug the first application to allow the first communication terminal to activate the first application on the first communication terminal, wherein the first association information includes
association information that associates, for each one of the plurality of applications, developer identification information for identifying a developer permitted to debug the application with the application identification information of the application; and association information that associates the developer identification information of the developer with the terminal identification information for identifying a communication terminal owned by the developer, wherein, in response to a registration request for registering an additional communication terminal as a communication terminal owned by the developer, the method further comprising;

requesting the additional communication terminal to install a debugger; and additionally storing terminal identification information for identifying the additional communication terminal in association with the developer identification information of the developer.

* * * * *